(12) United States Patent
Kempf et al.

(10) Patent No.: US 7,874,498 B2
(45) Date of Patent: Jan. 25, 2011

(54) WATER CONTROL FIXTURE HAVING THERMOSTATICALLY CONTROLLED BYPASS VALVE

(75) Inventors: Dale Kempf, Manton, CA (US); Ken Lum, Fresno, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 1113 days.

(21) Appl. No.: 11/594,470

(22) Filed: Nov. 8, 2006

(65) Prior Publication Data

US 2007/0114290 A1 May 24, 2007

Related U.S. Application Data

(60) Continuation-in-part of application No. 11/172,681, filed on Jul. 1, 2005, now Pat. No. 7,140,382, which is a division of application No. 10/006,970, filed on Dec. 4, 2001, now Pat. No. 6,929,187, which is a continuation-in-part of application No. 09/697,520, filed on Oct. 25, 2000, now Pat. No. 6,536,464.

(60) Provisional application No. 60/251,122, filed on Dec. 5, 2000, provisional application No. 60/850,171, filed on Oct. 5, 2006.

(51) Int. Cl.
*G05D 23/12* (2006.01)
(52) U.S. Cl. .................... 236/12.13; 236/93 R
(58) Field of Classification Search ............... 236/12.1, 236/12.11, 12.13, 93 R
See application file for complete search history.

(56) References Cited

U.S. PATENT DOCUMENTS

| | | | |
|---|---|---|---|
| 2,507,954 A | 5/1950 | Binnall | |
| 2,716,424 A | 8/1955 | Watts | |
| 2,833,695 A | 5/1958 | Kool | |
| 2,842,155 A | 7/1958 | Peters | |
| 3,232,336 A | 2/1966 | Leslie | |
| 3,543,836 A | 12/1970 | Paulson | |

(Continued)

FOREIGN PATENT DOCUMENTS

| | | |
|---|---|---|
| DE | 297 18 257 U 1 | 7/1998 |
| DE | 197 12 051 | 9/1998 |
| EP | 1 018 063 B1 | 5/2004 |
| WO | WO 98/43143 | 10/1998 |

OTHER PUBLICATIONS

IDS Submitted Dec. 13, 2002 in U.S. Appl. No. 09/697,520, 5 pg.
Remarks Section of Amendment Filed Jul. 18, 2002 in U.S. Appl. No. 09/697,520, 4 pg.
USPTO Office Action Dated Mar. 21, 2006, For U.S. Appl. No. 11/172,681, filed Jul. 1, 2005, 6 pg.
Metlund Systems, 1999, Total 1 pg. Advance Conservation Technology.
The Blumenauer Corporation Aqualink, Why Wait for Hot Water?; Apr. 19, 2001; 4 pages, 2004.
The Blumenauer Corporation Aqualink, How it Works; Apr. 19, 2001; 2 pages, 2004.

(Continued)

*Primary Examiner*—Marc E Norman
(74) *Attorney, Agent, or Firm*—The Small Patent Law Group; Dean D. Small; Jay J. Hoette

(57) ABSTRACT

A water control fixture configured to be fluidly coupled to a cold water supply line and a hot water supply line of a water circulating system includes a housing having a cold water inlet, a hot water inlet, and an outlet. The fixture also includes at least one operating valve disposed in the housing for controlling the flow of water from the cold water inlet and from the hot water inlet to the outlet, and a thermostatically controlled bypass valve disposed in the housing. The bypass valve is configured to bypass water from the hot water inlet to the cold water inlet based on a temperature of the water at the hot water inlet.

39 Claims, 15 Drawing Sheets

U.S. PATENT DOCUMENTS

| | | |
|---|---|---|
| 3,741,195 A | 6/1973 | Ellis |
| 3,989,058 A | 11/1976 | Jackson |
| 4,068,800 A | 1/1978 | Doherty, Jr. |
| 4,142,515 A | 3/1979 | Skaats |
| 4,311,272 A | 1/1982 | Föller |
| 4,321,943 A | 3/1982 | Haws |
| 4,331,292 A | 5/1982 | Zimmer |
| 4,606,325 A | 8/1986 | Lujan, Jr. |
| 4,896,658 A | 1/1990 | Yonekubo |
| 4,917,294 A | 4/1990 | Bergmann et al. |
| 4,930,551 A | 6/1990 | Haws |
| 5,119,988 A | 6/1992 | Fiedrich |
| 5,135,021 A | 8/1992 | Pegg |
| 5,183,029 A | 2/1993 | Ranger |
| 5,205,318 A | 4/1993 | Massaro |
| 5,209,401 A | 5/1993 | Fiedrich |
| 5,261,443 A | 11/1993 | Walsh |
| 5,263,643 A | 11/1993 | Wells et al. |
| 5,287,570 A | 2/1994 | Peterson |
| 5,323,803 A | 6/1994 | Blumenauer |
| 5,503,183 A | 4/1996 | Fenn |
| 5,572,985 A | 11/1996 | Benham |
| 5,606,987 A | 3/1997 | Weber |
| 5,623,990 A | 4/1997 | Pirkle |
| 5,791,557 A | 8/1998 | Kunze |
| 5,819,785 A | 10/1998 | Bardini |
| 5,829,467 A | 11/1998 | Spicher |
| 5,873,518 A | 2/1999 | Richmond |
| 6,257,493 B1 | 7/2001 | Chamot et al. |
| 6,286,464 B1 | 9/2001 | Abraham |
| 6,929,187 B2 | 8/2005 | Kempf |
| 7,104,461 B2 | 9/2006 | Restivo, Sr. et al. |
| 2007/0246549 A1* | 10/2007 | Kline ................ 236/12.2 |

OTHER PUBLICATIONS

The Blumenauer Corporation, Aqua-Heat Hot Water recirculating System; 4 pages, 2004.
Laing Autocirc; Undersink Automatic Instant Hot Water Delivery System; Model ACT-303-BTW; 2 pages, 2004.
Laing Autocirc; Model No. ACT-303-BTW; Economic Study; 3 pages, 2004.
Laing; Instant Hot Water Delivery Systems; Autocirc; Questions and Answers; 3 pages, 2004.
Metlund (S-46, S01, and S02) PreFab Systems; S-Series Hot Water D'Mand Systems For Standard Piping(non-recirc) Installation and Operating Instructions; 7 pg, 2004.
Metlund D'Mand Systems; Got Hot Water? 2 pages, 2004.
Jim Dulley, Update Bulletin No. 991, 2001, 4 pages, 2004.
Metlund Systems, Advanced Conservation Tchnology, Inc. 16 pages, 2004.
Medlund Systems, Easy Installation Instructions, 10 pages, 2004.
Medlund Systems, Energy Technology Status Report-E.T.S.R., 11 pages, 2004.
Medlund Systems, Online Ordering, Purchasing Tips, 2 pages, 2004.
Grundfos Hot Water Recirulation Product and Application Guide, 10 pages, 2004.
NIBCO.com Just Right, Hot Water In Seconds!, 10 pages, 2004.
The Chilipepper Hot Water Appliance, How to Get Faster Hot Water!!!, 22 pages, 2004.
Installation and Operating Instructions for the Chilipepper Appliance, 2 pages, 2004.

* cited by examiner

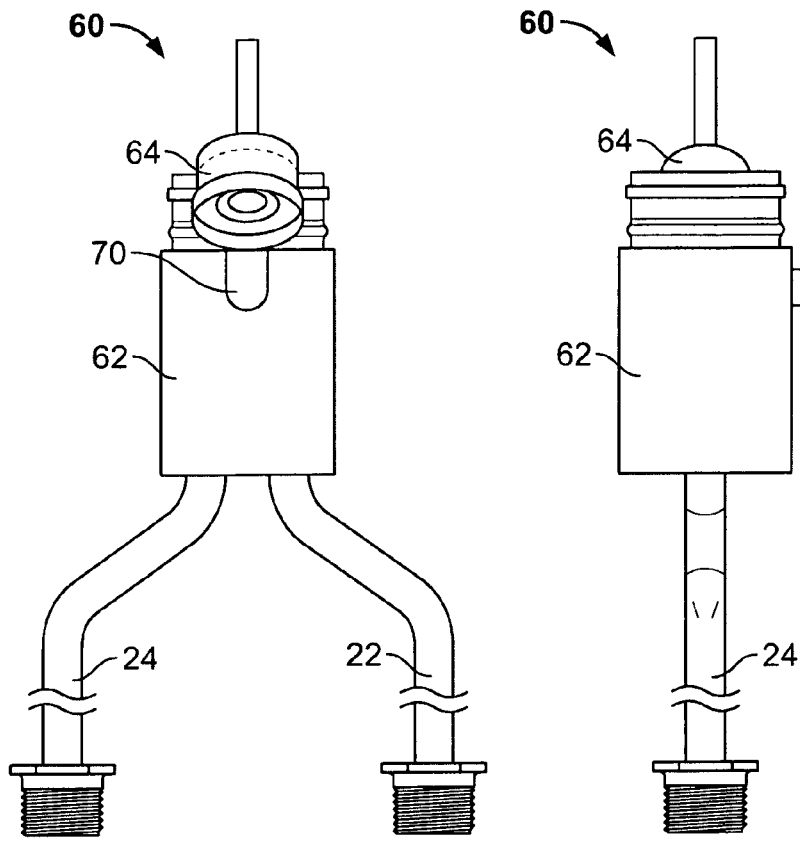
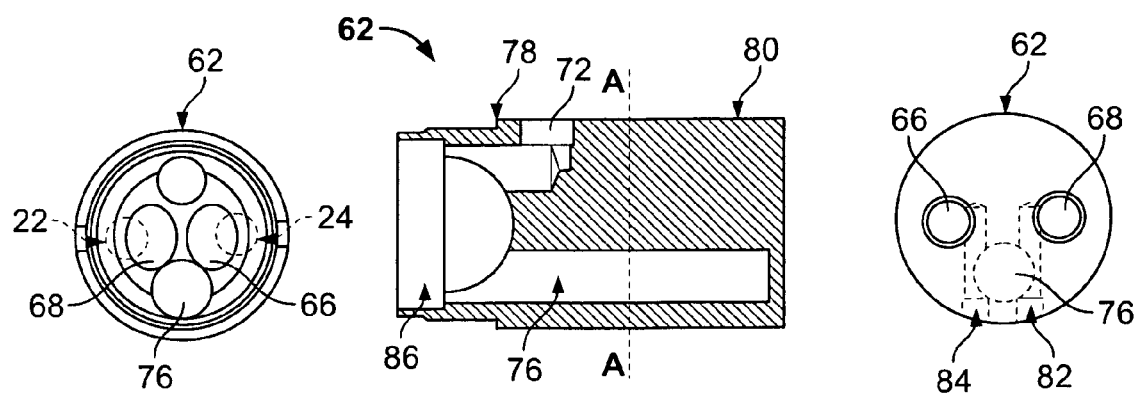
FIG. 3  FIG. 4
FIG. 5  FIG. 6  FIG. 7

WATER CONTROL FIXTURE HAVING THERMOSTATICALLY CONTROLLED BYPASS VALVE

CROSS-REFERENCE TO RELATED APPLICATIONS

This application is a continuation-in-part of a provisional patent No. 60/850,171, filed Oct. 5, 2006, and is a continuation-in-part of U.S. patent application Ser. No. 11/172,681, filed Jul. 1, 2005, issued as U.S. Pat. No. 7,140,382, which was a divisional of U.S. patent application Ser. No. 10/006,970, filed Dec. 4, 2001, issued as U.S. Pat. No. 6,929,187, which was a continuation-in-part of U.S. patent application Ser. No. 09/697,520 filed Oct. 25, 2000, issued as U.S. Pat. No. 6,536,464, and claimed priority to U.S. Provisional Application No. 60/251,122 filed Dec. 5, 2000, the complete subject matter from all of which is expressly incorporated herein by referenced in its entirety.

BACKGROUND OF THE INVENTION

1. Field of the Invention

The present invention relates generally to faucets and bypass valves for use in home or industrial water distribution systems that supply water to various fixtures at different temperatures through different pipes. More particularly, the present invention relates to faucets having bypass valves that are thermostatically controlled so as to automatically bypass water that is not at the desired temperature for use at the fixture. Even more particular, the present invention relates to faucets having an integral thermostatically controlled bypass valve.

2. Background

Home and industrial water distribution systems distribute water to various fixtures, including sinks, bathtubs, showers, dishwashers and washing machines, that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixture where it will be used (i.e., the cold water side of the faucet at the kitchen sink). Another segment of the piping system delivers the incoming cold water to a water heater which heats the water to the desired temperature and distributes it to the various hot water connections where it will be used (i.e., the hot water side of the kitchen faucet). At the fixture, cold and hot water either flow through separate hot and cold water control valves that are independently operated to control the temperature of the water into the fixture by controlling the flow rate of water from the valves or the water is mixed at a single valve that selectively controls the desired temperature flowing into the fixture.

A well known problem common to most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time (i.e., overnight), the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. At the sink, bathtub or shower fixture located away from the water heater, the person desiring to use the fixture will either have to use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the hot water. For certain fixtures, such as dishwashers and washing machines, there typically is no method of "draining" away the cold or tepid water in the hot water pipes prior to utilizing the water in the fixture.

The inability to have hot water at the hot water side of the fixture when it is desired creates a number of problems. One problem is having to utilize cold or tepid water when hot water is desired. This is a particular problem for the dishwasher and washing machine fixtures in that hot water is often desired for improved operation bf those fixtures. As is well known, certain dirty dishes and clothes are much easier to clean in hot water as opposed to cold or tepid water. Even in those fixtures where the person can let the cold or tepid water flow out of the fixture until it reaches the desired warm or hot temperature, there are certain problems associated with such a solution. One such problem is the waste of water that flows out of the fixture through the drain and, typically, to the sewage system. This good and clean water is wasted (resulting in unnecessary water treatment after flowing through the sewage system). This waste of water is compounded when the person is inattentive and hot water begins flowing down the drain and to the sewage system. Yet another problem associated with the inability to have hot water at the hot water valve when needed is the waste of time for the person who must wait for the water to reach the desired temperature.

The use of bypass valves and/or water recirculation systems in home or industrial water distribution systems to overcome the problems described above have been known for some time. The objective of the bypass valve or recirculation system is to avoid supplying cold or tepid water at the hot water side of the piping system. U.S. Pat. No. 2,842,155 to Peters describes a thermostatically controlled water bypass valve, shown as FIG. 2 therein, that connects at or near the fixture located away from the water heater. In his patent, the inventor discusses the lack of hot water problem and describes a number of prior art attempts to solve the problem. The bypass valve in this patent comprises a cylindrical housing having threaded ends that connect to the hot and cold water piping at the fixture so as to interconnect these piping segments. Inside the housing at the hot water side is a temperature responsive element having a valve ball at one end that can sealably abut a valve seat. The temperature responsive element is a metallic bellows that extends when it is heated to close the valve ball against the valve seat and contracts when cooled to allow water to flow from the hot side to the cold side of the piping system when both the hot and cold water valves are closed. Inside the housing at the cold water side is a dual action check valve that prevents cold water from flowing to the hot water side of the piping system when the hot water valve or the cold water valve is open. An alternative embodiment of the Peters' invention shows the use of a spiral temperature responsive element having a finger portion that moves left or right to close or open the valve between the hot and cold water piping segments. Although the invention described in the Peters' patent relies on gravity or convection flow, similar systems utilizing pumps to cause a positive circulation are increasingly known. These pumps are typically placed in the hot water line in close proximity to the faucet where "instant" hot water is desired.

U.S. Pat. No. 5,623,990 to Pirkle describes a temperature-controlled water delivery system for use with showers and eye-wash apparatuses that utilize a pair of temperature responsive valves, shown as FIGS. 2 and 5 therein. These valves utilize thermally responsive wax actuators that push valve elements against springs to open or close the valves to allow fluid of certain temperatures to pass. U.S. Pat. No. 5,209,401 to Fiedrich describes a diverting valve for hydronic heating systems, best shown in FIGS. 3 through 5, that is used in conjunction with a thermostatic control head having a sensor bulb to detect the temperature of the supply water. U.S. Pat. No. 5,119,988 also to Fiedrich describes a three-way modulating diverting valve, shown as FIG. 6. A non-electric, thermostatic, automatic controller provides the force for the modulation of the valve stem against the spring. U.S. Pat. No. 5,287,570 to Peterson et al. discloses the use of a bypass valve located below a sink to divert cold water from the hot water faucet to the sewer or a water reservoir. As discussed with regard to FIG. 5, the bypass valve is used in conjunction with a separate temperature sensor, A recirculating system for domestic and industrial hot water heating utilizing a bypass valve is disclosed in U.S. Pat. No. 5,572,985 to Benham. This system utilizes a circulating pump in the return line to the water heater and a temperature responsive or thermostatically actuated bypass valve disposed between the circulating pump and the hot water heater to maintain a return flow temperature at a level below that at the outlet from the water heater. The bypass valve, shown in FIG. 2, utilizes a thermostatic actuator that extends or retracts its stem portion, having a valve member at its end, to seat or unseat the valve. When the fluid temperature reaches the desired level, the valve is unseated so that fluid that normally circulates through the return line of the system is bypassed through the circulating pump.

Despite the devices and systems set forth above, many people still have problems with obtaining hot water at the hot water side of fixtures located away from the hot water heater or other source of hot water. Boosted, thermally actuated valve systems having valves that are directly operated by a thermal actuator (such as a wax filled cartridge) tend not to have any toggle action. Instead, after a few on-off cycles, the valves tend to just throttle the flow until the water reaches an equilibrium temperature, at which time the valve stays slightly cracked open. While this meets the primary function of keeping the water at a remote faucet hot, leaving the valve in a slightly open condition does present two problems. First, the lack of toggle action can result in lime being more likely to build up on the actuator because it is constantly extended. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. If the bypass valve is equipped with a spring loaded check valve to prevent siphoning of cold water into the hot water side when only the hot water faucet is open, then the very small flow allowed through the throttled-down valve may cause chattering of the spring loaded check valve. The chattering can be avoided by using a free floating or non-spring loaded check valve, it is also detrimental to have any noticeable crossover flow (siphoning) from hot to cold or cold to hot with any combination of faucet positions, water temperatures, or pump operation.

U.S. Pat. No. 6,536,464 the disclosure of which is incorporated herein as fully set forth and having some of the same inventors and the same assignee as the present invention, describes an under-the-sink thermostatically controlled bypass valve and water circulating system with the bypass valve placed at or near a fixture (i.e., under the sink) to automatically bypass cold or tepid water away from the hot water side of the fixture until the temperature of the water reaches the desired level. The system described in U.S. Pat. No. 6,536,464 includes a single small circulating pump that is placed between the water heater and the first branching in the hot water supply line which supplies the fixture having a bypass valve so as to pressurize the hot water piping system and facilitate bypassing of the cold or tepid water.

The public is accustomed to purchasing faucets for lavatories, bathtubs, showers, kitchen sinks and etc. that can be readily repaired, usually by removing a top mounted handle and bonnet, and replacing a faucet washer or other seal or seat. In recent designs, the sealing action occurs within a replaceable cartridge, which can be easily replaced by the home repair person. None of the known prior art devices include the use of an integral thermostatically controlled bypass valve to bypass water as described above. However, for a thermal bypass valve to be included in a faucet, it is necessary that it meet the same expectation for ease of repair as the standard faucet. There are several advantages to location of the thermal bypass valve within the faucet itself and being accessible from the top, which include: (1) elimination of the clutter resulting from extra hoses located below the sink and the need to do plumbing and maintenance below the sink; (2) elimination of the under-the-sink hoses, which by their very presence add potential leak paths at each end of each hose; (3) a new feature that a faucet manufacturer can use to define its top-of-the-line faucet, which can stimulate sales to those customers who like to have the latest in convenience; and (4) the bypass valve can be serviced by the home repair person or, if desired, professional plumber in a standing position in a manner which is already learned from the maintenance of existing design faucets.

The use of bypass valves and/or water recirculation systems in home or industrial water distribution systems to overcome the problems described above have been known for some time. The bypass valve or recirculation system is used to avoid supplying cold or tepid water at the hot water side of the piping system. One problem with these known bypass valves, is that over time and with age the valves, particularly valves that are directly operated by a thermal actuator (such as a wax filled cartridge) tend not to have any toggle action. Instead, after a few on-off cycles, the valves tend to just throttle the flow until the water reaches an equilibrium temperature, at which time the valve stays slightly cracked open. While this meets the function of keeping the water at a remote fixture hot, leaving the valve in a slightly open condition does present two problems. First, the lack of toggle action can result in scale being more likely to build up on the actuator because it is constantly extended. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. It is also detrimental to have any noticeable crossover flow (siphoning) from hot to cold or cold to hot with any combination of faucet positions, water temperatures, or pump operation.

SUMMARY OF THE INVENTION

In one aspect, a water control fixture configured to be fluidly coupled to a cold water supply line and a hot water supply line of a water circulating system is provided. The fixture includes a housing having a cold water inlet, a hot water inlet, and an outlet. The fixture also includes at least one operating valve disposed in the housing for controlling the flow of water from the cold water inlet and from the hot water inlet to the outlet, and a thermostatically controlled bypass valve disposed in the housing. The bypass valve is configured to bypass water from the hot water inlet to the cold water inlet based on a temperature of the water at the hot water inlet.

In another aspect, a water control fixture configured to be fluidly coupled to a cold water supply line and a hot water supply line of a water circulating system is provided. The fixture includes a housing having a cold water inlet, a hot water inlet, and an outlet. The fixture also includes at least one operating valve disposed in the housing for controlling the flow of water from the cold water inlet and from the hot water inlet to the outlet, and at least one handle operatively coupled to the operating valve. A thermostatically controlled bypass valve is disposed in the housing, wherein the bypass valve is configured to bypass water from the hot water inlet to the cold water inlet based on a temperature of the water at the hot water inlet.

BRIEF DESCRIPTION OF THE DRAWINGS

In the drawings which illustrate the best modes presently contemplated for carrying out the present invention:

FIG. 3 is a front view of a typical fixture body for a single handle faucet;

FIG. 4 is a side view of the single handle faucet in FIG. 3;

FIG. 5 is a top view of the faucet body housing for the faucet of FIG. 3;

FIG. 6 is a side cross-sectional view of the faucet body housing for the faucet of FIG. 3;

FIG. 7 is a bottom view of the faucet body housing of the faucet of FIG. 3;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are illustrative of the preferred embodiments and represent a preferred way of configuring the present invention. Although specific components, materials, configurations and uses are illustrated, it should be understood that a number of variations to the components and to the configuration of those components described herein and in the accompanying figures can be made without changing the scope and function of the invention set forth herein.

Figure 1:
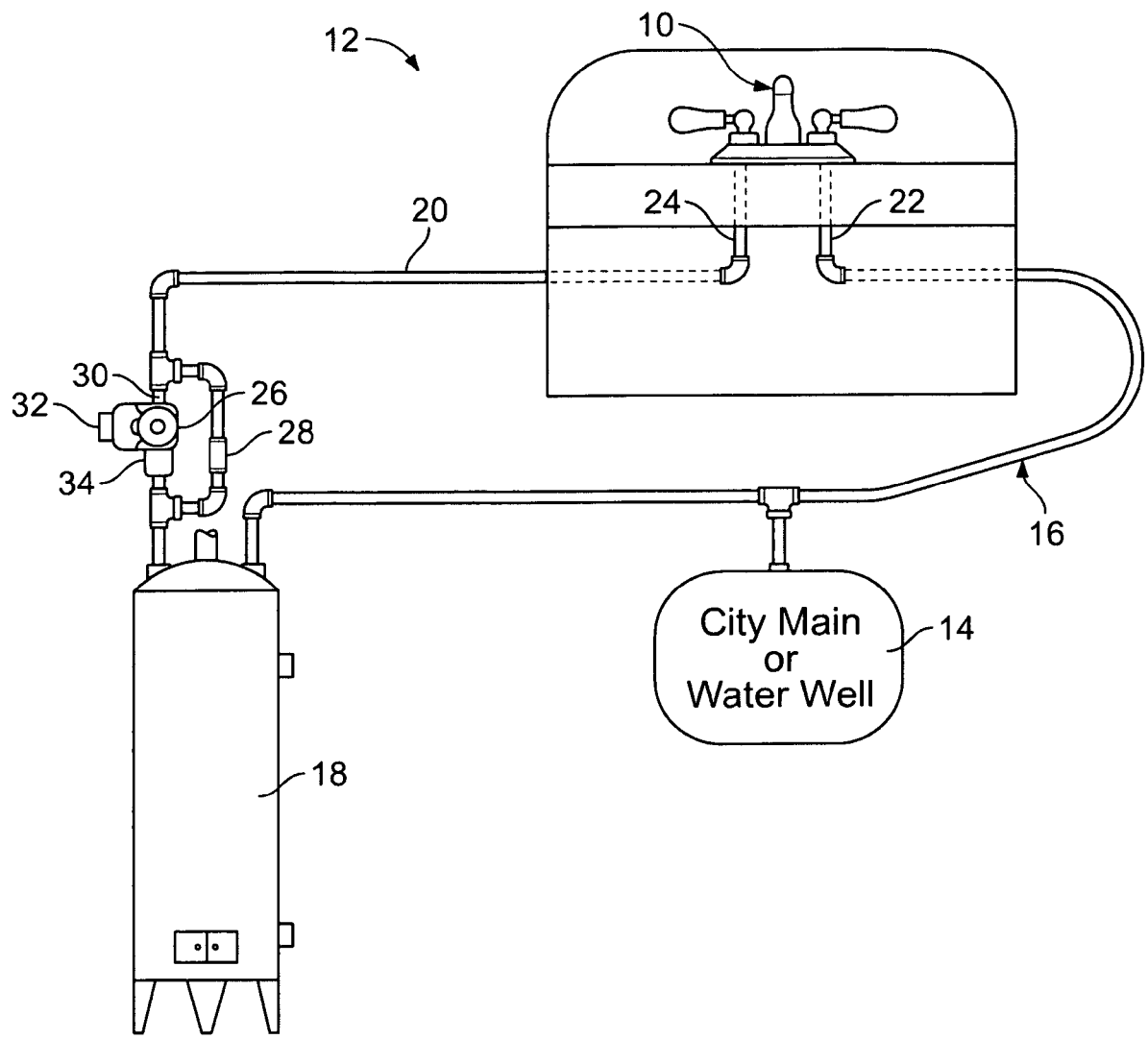
FIG. 1 shows a water distribution system that utilizes a water control fixture (faucet) having a thermostatically controlled bypass valve of the present invention.

In the accompanying drawings of the various preferred embodiments of a water control fixture of the present invention, the water control fixture is shown as faucet 10. However, other water control fixtures may be adaptable to the thermal bypass valve features described herein (i.e., solenoid valve used on home laundry washing machines). A typical water distribution system 12 utilizing faucet 10 of the present invention is illustrated in FIG. 1. The water distribution system 12 typically comprises a supply of cold water 14, such as from a city main or water well, that supplies cold water directly to faucet 10 through cold water line 16 and water to hot water heater 18 so that it may heat the water and supply hot water to faucet 10 through hot waterline 20. Cold water line 16 connects to faucet 10 through cold water inlet 22 and hot water line 20 connects to faucet 10 through hot water inlet 24, as explained in more detail below.

The preferred system 12 of the present invention utilizes a small circulating pump 26 of the type used in residential hot water space heating. A very low flow and low head pump is desirable because a larger (i.e., higher head/higher flow) pump mounted at the typical domestic water heater 18 tends to be noisy. This annoying noise is often transmitted by the water pipes throughout the house. In addition, if the shower (as an example) is already in use when pump 26 turns on, whether the first start or a later cyclic turn-on, the sudden pressure boost in the hot water line 20 from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature. In the preferred embodiment, the single, small pump 26 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump may, however, constitute a significant pressure drop in the hot water tine 20 when several fixture taps are opened simultaneously (such as a bathtub and the kitchen sink). To avoid reduced flow in those installations having a relatively low volume pump, a check valve 28 can be plumbed in parallel with pump 26 or incorporated within the pump housing, to pass a flow rate exceeding the pump's capacity around pump 26. When pump 26 is powered and flow demand is low, check valve 28 prevents the boosted flow from re-circulating back to its own inlet. With check valve 28 plumbed around pump 26, it is advantageous to place an orifice 30 in the pump discharge to provide a simple manner to achieve the desired very steep flow-head curve from available stock pump designs. A single pump 26 located at or near the water heater 18 in its discharge piping will boost the pressure in the hot water pipes somewhat above that in the cold water pipes (i.e., perhaps one to three feet of boost). With this arrangement only one pump 26 per plumbing system (i.e., per water heater 18) is required with any reasonable number of remote faucets 10 (i.e., the typical number used in residences) equipped with bypass valves. This is in contrast to those systems that require multiple pumps, such as a pump at each fixture where bypassing is desired.

If desired, pump 26 can operate twenty-four hours a day, with most of the time in the no flow mode. However, this is unnecessary and wasteful of electricity. Alternatively, pump 26 can have a timer 32 to turn on the pump 26 daily at one or more times during the day just before those occasions when hot water is usually needed the most (for instance for morning showers, evening cooking, etc.) and be set to operate continuously for the period during which hot water is usually desired. This still could be unnecessary and wasteful of electricity. Another alternative is to have the timer 32 cycle pump 26 on and off regularly during the period when hot water is in most demand. The "on" cycles should be of sufficient duration to bring hot water to all remote fixtures 10 that are equipped with a bypass valve, and the "off period would be set to approximate the usual time it takes the water in the lines to cool-down to minimum acceptable temperature. Yet another alternative is to equip pump 26 with a normally closed flow switch 34 sized to detect significant flows only (i.e., those flows that are much larger than the bypass valve flows), such as a shower flowing. For safety purposes, the use of such a switch 34 is basically required if a cyclic timer 32 is used. The switch 34 can be wired in series with the motor in pump 26. If the switch 34 indicates an existing flow at the moment the timer calls for pump 26 to be on, the open flow switch 34 will prevent the motor from starting, thereby avoiding a sudden increase in water temperature at the fixture 10 (i.e., particularly if it is a shower) being utilized. The use of such switch 34 accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 28 required with a "small" pump.

By using a time-of-day control timer 32, pump 26 operates to maintain "instant hot water" only during periods of the day when it is commonly desired. During the off-cycle times, the plumbing system 12 operates just as if the faucet 10 having bypass valves and pump 26 were not in place. This saves electrical power usage from pump operation and, more importantly, avoids the periodic introduction of hot water into relatively un-insulated pipes during the off-hours, thereby saving the cost of repeatedly reheating this water. The time-of-day control also avoids considerable wear and tear on pump 26 and the bypass valve in faucet 10. Considerable additional benefits are gained by using a cyclic timer 32, with or without the time-of-day control. In addition to saving more electricity, if a leaky bypass valve or one not having toggle action is used, there will be no circulating leakage while the pump 26 is cycled off, even if the valve fails to shut off completely. Therefore, a simple (i.e., one not necessarily leak tight) valve may suffice in less demanding applications. Having the leakage reduced to just intermittent leakage will result in reduced warming of the cold water line 16 and less reheating of "leaking" re-circulated water.

Figure 2:
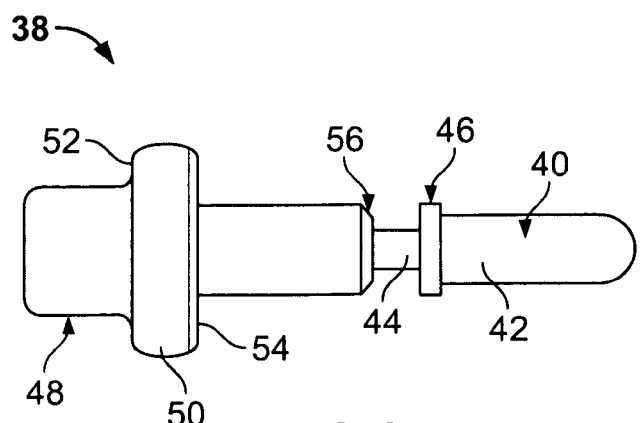
FIG. 2 is a side view of the preferred thermally sensitive actuating element, shown in its unmodified condition, for use in the bypass valve of the present invention.

The bypass valve assemblies 36 utilized with the present invention have a thermally sensitive actuating element 38, an example of which is shown in FIG. 2, for thermostatically controlling bypass valve 36. Actuating element 38 is preferably of the wax filled cartridge type, also referred to as wax motors, having an integral poppet rod member 40, as best shown in FIG. 2. Rod member 40 comprises poppet 42 attached to piston 44 with an intermediate flange 46 thereon. The end of poppet 42 is configured to seat directly against a valve seat or move a shuffle (i.e., spool or sleeve valves) so as to close a passage. These thermostatic control elements 38 are well known in the art and are commercially available from several suppliers, such as Caltherm of Bloomfield Hills, Mich. The body 48 of actuating element 38 has a section 50 of increased diameter, having a first side 52 and second side 54, to seat against a shoulder or like element in a valve body. Piston 44 of rod member 40 interconnects poppet 42 with actuator body 48. Actuating element 38 operates based on temperature to open and close the bypass valve assembly 36. For example, the actuating element 38 may expand and contract based on temperature. In one embodiment, the bypass valve assembly 36 closes when the actuating element 38 expands and the bypass valve assembly 36 opens when the actuating element 38 contracts. Alternatively, the bypass valve assembly 36 opens when the actuating element 38 expands and the bypass valve assembly 36 closes when the actuating element 38 contracts. In an exemplary embodiment, the actuating element 38 comprises a blend of waxes or a mixture of wax(es) and metal powder (such as copper powder) enclosed in actuator body 48 by means of a membrane made of elastomer or the like. Upon heating the wax or wax with copper powder mixture expands, thereby pushing piston 44 and poppet 42 of rod member 40 in an outward direction. Upon cooling, the wax or wax/copper powder mixture contracts and rod member 40 is pushed inward by a bias spring until flange 46 contacts actuator body 48 at actuator seat 56.

Although other types of thermal actuators, such as bimetallic springs and memory alloys (i.e., Nitinol and the like) can be utilized in the present invention, the wax filled cartridge type is preferred because the wax can be formulated to change from the solidus to the liquid state at a particular desired temperature. The rate of expansion with respect to temperature at this change of state is many times higher, resulting in almost snap action of the wax actuating element 38. The temperature set point is equal to the preset value, such as 97 degrees Fahrenheit, desired for the hot water. This is a "sudden" large physical motion over a small temperature change. As stated above, this movement is reacted by a bias spring that returns rod member 40 as the temperature falls.

Because the bypass valve 36 has little or no independent "toggle action," after a few cycles of opening and closing, the valve tends to reach an equilibrium with the plumbing system, whereby the bypass valve 36 stays slightly cracked open, passing just enough hot water to maintain the temperature constantly at its setting. In particular plumbing systems and at certain ambient conditions, this flow is just under that required to maintain a spring loaded check valve cracked continuously open. In such a situation, the check valve chatters with an annoying buzzing sound. To avoid this occurrence, the spring may be removed from the check valve, leaving the poppet free floating. In the event that the hot water is turned full on at a time when the bypass valve 36 is open, thereby lowering the pressure in the hot water line 20, and so inducing flow from the cold water line 16 through the open bypass valve 36 to the hot side, the free-floating poppet will quickly close. There is no necessity for a spring to keep this check valve closed prior to the reversal in pressures.

Although not entirely demonstrated in early tests, it is believed that beneficial "toggle" action can be achieved with a bypass valve 36 of very simple mechanical design. If the motion of the thermal actuator 38 is made to lag behind the temperature change of the water surrounding it by placing suitable insulation around the actuator 38 or by partially isolating it from the water, then instead of slowly closing only to reach equilibrium at a low flow without reaching shutoff, the water temperature will rise above the extending temperature of the insulated actuator 38 as the valve approaches shutoff, and the piston 44 will then continue to extend as the internal temperature of the actuator 38 catches up to its higher surrounding temperature, closing the valve 36 completely. It is also believed that an insulated actuator 36 will be slow opening, its motion lagging behind the temperature of the surrounding cooling-off water from which it is insulated. When actuating element 38 finally begins to open the valve 36 and allow flow, the resulting rising temperature of the surrounding water will again, due to the insulation, not immediately affect it, allowing the bypass valve 36 to stay open longer for a complete cycle of temperature rise. Such an "insulated" effect may also be accomplished by use of a wax mix that is inherently slower, such as one with less powdered copper or other thermally conductive filler. An actuator 38 to be installed with insulation can be manufactured with a somewhat lower set point temperature to make up for the lag, allowing whatever valve 36 closing temperature desired.

An additional benefit of utilizing pump 26 in system 12 is that shut-off of a toggle action valve upon attainment of the desired temperature is enhanced by the differential pressure an operating pump 26 provides. If pump 26 continues to run as the water at the faucet 10 cools down, the pump-produced differential pressure works against re-opening a poppet type bypass valve 36 in faucet 10. If pump 26 operates cyclically, powered only a little longer than necessary to get hot water to faucet 10, it will be "off before the water at valve 36 cools down. When the minimum temperature is reached, the thermal actuator 38 will retract, allowing the bias spring to open valve 36 without having to fight a pump-produced differential pressure. By-pass flow will begin with the next pump "on" cycle. An additional benefit to the use of either a time-of-day or cyclic timer 32 is that it improves the operating life of thermal actuator 38. Because use of either timer 32 causes cyclic temperature changes in valve 36 (as opposed to maintaining an equilibrium setting wherein temperature is constant and the actuator 38 barely moves), there is frequent, substantial motion of the piston 44 in thermal actuator 38. This exercising of actuator 38 tends to prevent the build-up of hard water deposits and corrosion on the cylindrical surface of actuator piston 44 and face of poppet 42, which deposits could render the valve 36 inoperable.

Also inside valve 36 can be an over-travel spring (not shown) disposed between the first side 52 of the actuator body 48 and a stop located inside valve 36 to prevent damage to a fully restrained actuator 38 if it were heated above the bypass valve's maximum operating temperature and to hold the actuator 38 in place during operation without concern for normal tolerance. Use of an over-travel spring, which is not necessary for spool-type valves, allows movement of the actuator body 48 away from the seated poppet 42 in the event that temperature rises substantially after the poppet 42 contacts its seat. Without this relief, the expanding wax could distort its copper can, destroying the calibrated set point. The over-travel spring also holds the bias spring, rod member 40 and actuator body 48 in place without the need to adjust for the stack-up of axial tolerances. Alternatively, actuator 38 can be fixedly placed inside valve 36 by various mechanisms known in the art, including adhesives and the like. Over-travel spring, if used, can be held in place by various internal configurations commonly known in the art, such as a molded seat.

As there are a great many configurations and brands of faucets 10, there are several different preferred designs of bypass valve 36 placement and arrangement to accommodate these many faucet configurations. For purposes of illustrating the present invention, various specific examples are set forth below. The following examples are representative of the types of uses to which the integral or in-faucet bypass valve 36 is suitable. The examples are for illustrative purposes only and are not intended to restrict the invention to particular uses, sizes or materials used in the examples.

For instance, there are several basic types of faucet assemblies, including those that have a single handle faucet assembly that mixes the hot and cold water and delivers a flow of water out the single spout based on the user's movement of the faucets valve assembly. Another common type of faucet assembly is the dual handle, single spout faucet assembly that has separate handles for the hot and cold water. As with the single handle assembly, the hot and cold water are mixed prior to the spout based on the user's selection of the amount of flow of hot and/or cold water. A third, older arrangement is the use of completely separate faucets for hot and cold water. Although the different manufacturers of faucets may utilize different arrangements of valving components, different valving mechanisms and/or different valves to water supply line connections, the bypass valve system of the present invention is adaptable to all such known configurations. As set forth below, the primary selection in the use of the bypass faucet assembly of the present invention is whether to place the bypass valve in a stationary portion of the faucet, such as the hot water piping leading to the faucet or in a housing or block portion of the faucet, or to place the bypass valve in the moveable valving of the faucet. Selection of which location to place the bypass valve assembly will often be dictated by economics, preferences, limitations on the amount of space available, the current design of the faucet and/or the willingness to change.

Example 1

Single Handle Faucets w/Bypass Valve in Stationary Block

As is well known, single handle faucets, an example of which is shown as fixture body 60, faucet 10 without its decorative covering, in FIGS. 3 and 4, have both hot 24 and cold 22 water inlets connected to a housing or block 62. Various internal valving means, such as pivoting and rotating ball 64, selectively and adjustably control the volume and temperature of the flow of water by connecting the hot 20 and cold 16 lines, through hot and cold conduits 66 and 68 respectively (as shown in FIGS. 5 and 7), to a single outlet spout 70 through spout outlet 72. In such designs, the thermal bypass valve 36 is preferably assembled into an easily replaceable cartridge 74, shown best in FIGS. 8, 9 and 10, that can be located within the hot water conduit 66 of fixture body 60 (if the design provides such access) or in an added cavity 76 placed between and connected to the hot 24 and cold 22 inlets, as shown in FIG. 7. In either case, the bypass valve 36 senses and is controlled by the temperature of the "hot" water in the fixture body 60. When the "hot" water is cooled off due to long disuse, the bypass valve 36 will open, providing a conduit between the hot 24 and cold 22 inlets. If the hot water line pump 26 is then turned on, the boosted pressure in the hot water line 20 will produce flow through the open bypass valve 36, bringing "hot" water to the fixture body.

In the above-mentioned arrangements, the flow of water from both hot 20 and cold 16 lines remains unimpeded due to the previously mentioned internal valving arrangement of the fixture body 60. The flow from the hot line 20 through the bypass valve cartridge 74 to the cold line 16 is provided through molded or cast passages or cross-drilled holes, discussed below.

The single handle faucet body 60 with spherical ball valving means 64, shown in FIGS. 3 and 4, is a good example of a faucet design that can be easily and economically re-designed to include a bypass valve cartridge 74 in the stationary housing 62. Use of this approach requires a new fixture body 60 to be installed, with a top-accessible, suitably sized cavity 76 to hold the bypass cartridge 74 and connect conduits 66 and 68 built into the fixture body 60 to accommodate the bypassed flow from the hot 20 to the cold '16 lines. FIGS. 5 through 7 show a modified and lengthened version of a Delta housing 62 that is used with the standard Delta faucet outer housing. The portion 78 above line AA (i.e., to the left of in FIG. 6) it is essentially an original Delta housing, with the addition of bore 76. Below AA (i.e., to the right of in FIG. 6) is extension 80. In the preferred use of the present invention, these sections 78 and 80 would be made in a single, integral housing 62. Cavity 76 and the drilled and plugged cross passages 82 and 84 are added, and the top bore 86 is extended inward if and as much as is needed to accommodate any necessary devices, such as a ring or washer to hold cartridge assembly 74 in place in cavity 76. Drilled passage 82 connects the cold water supply to cavity 76 near its top and drilled passage 84 connects the hot water line 20 to cavity 76 near its bottom.

Figure 8:
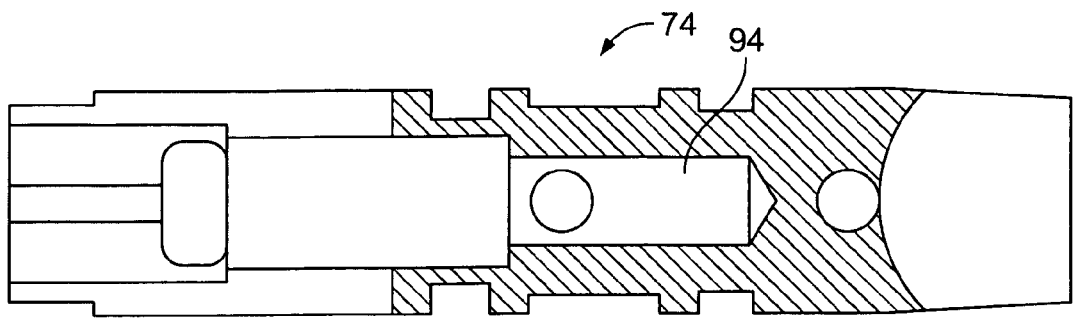
FIG. 8 is a sectional view of a bypass valve cartridge body for use with the present invention.
Figure 9:
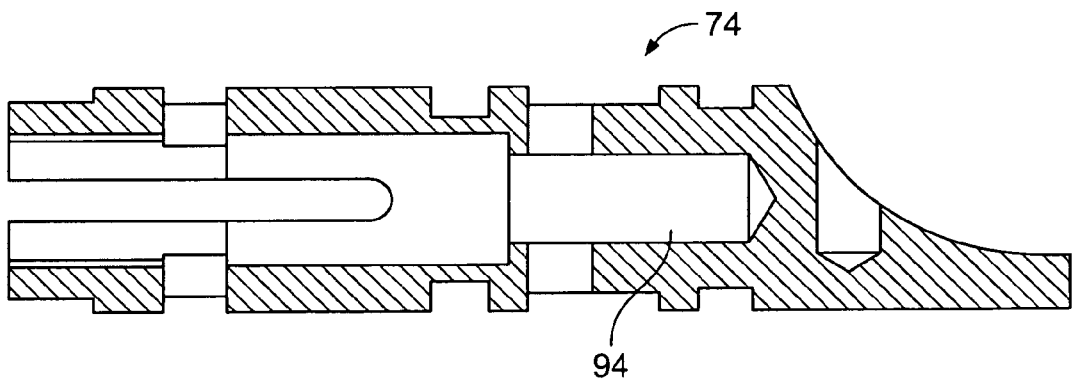
FIG. 9 is a sectional view of the bypass valve cartridge body taken at 90 degrees to FIG. 8.
Figure 10:
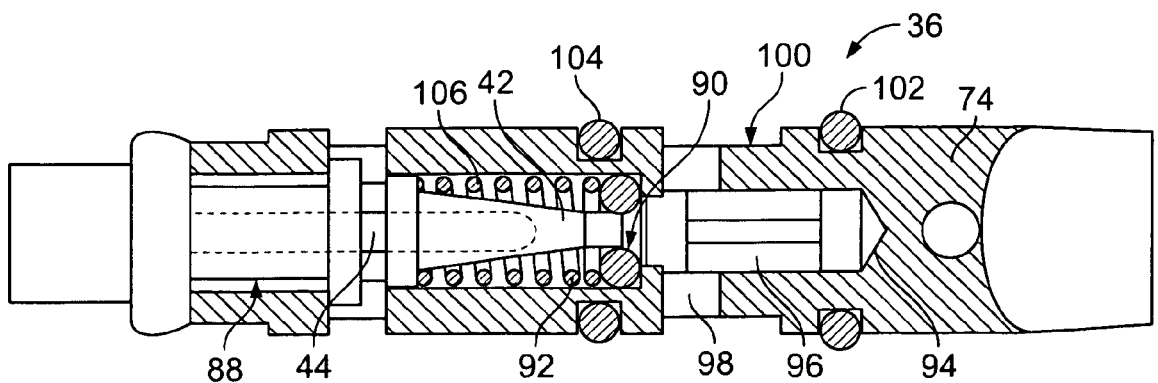
FIG. 10 is a sectional view of the bypass valve cartridge body of FIG. 8 with a bypass valve and other components place therein.

FIGS. 8 and 9 show the bypass valve cartridge 74, without its internal components, that is designed and configured to fit in cavity 76. FIG. 10 shows the components, including thermal actuator 88, assembled together as they would fit into cavity 76. The thermal actuator 88 is a modified version of the actuator 38 that is used in U.S. Pat. No. 6,536,464 and shown in FIG. 2 herein. Water from hot water line 20 is carried through drilled hole 84 to the lower end of cavity 76 and flows up around and through the cartridge 74 to and through the open valve seat 90 (poppet 42 is shown closed into against 0-ring 92 forming seat 90 in FIG. 10) into the check valve chamber 94 housing check valve 96 and out through the cross drilled hole 98 into an annulus 100 on the cartridge 74. From annulus 100, between 0-rings 102 and 104, the water flows through drilled passage 82 to the cold water supply. When sufficient water has flowed through the bypass valve 36 to exhaust the cooled-off water in the hot water supply line 20 and bring hot water to the bypass valve 36, the thermal actuator 88 will cause piston 44 to extend, forcing poppet 42 into seat 90 to close off the flow. The seat 0-ring 92 is held in place by spring 106, which doubles as the bias or poppet return spring. In the preferred embodiment, thermal actuator 88 is held in place by a snap fit into the split cartridge 74, which is designed to be easily moldable. The check valve 96 is included to prevent flow of cold water into the hot side when the hot water is turned full on in the system, or the equivalent usage of hot water, resulting in a lowered pressure on the hot side. The cartridge 74 can be held down in cavity 76 by a brass ring, or the like, which is in turn held down by the screw-on bonnet, which also captures the existing ball valving assembly 64.

Figure 11:
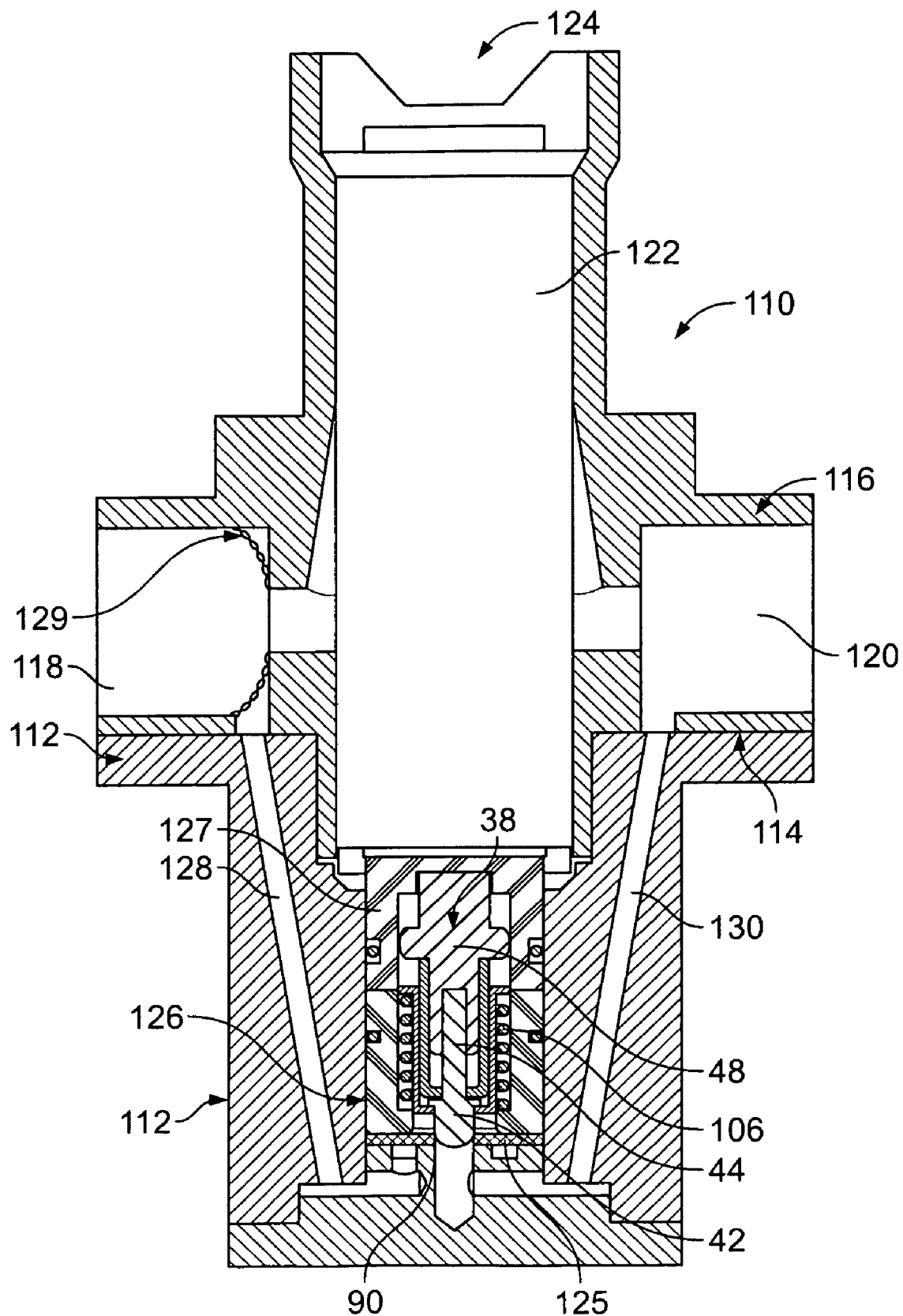
FIG. 11 is a cross-sectional view of the side of a shower faucet that utilizes a cartridge insert (not shown) for controlling the flow of water through the faucet showing the placement of a bypass valve therein.

Another example of a single handle water control fixture is shown as 110 in FIG. 11. This fixture 110 is a modified Moen shower valve that comprises a rear housing 112 attached to the rear 114 of Moen housing 116. Housing 116 has a hot water inlet port 118 and a cold water inlet port 120 for receiving hot and cold water, respectively, from the hot 20 and cold 16 water lines and a valve cavity 122 for receiving the operating valve (not shown) through valve opening 124. The operating valve controls the flow of hot and cold water out of the spout associated with valve 110. Rear housing 112 has a cavity 126 configured to hold cartridge 127 and hot 128 and cold 130 water channels to allow passage of water around valve cavity 126 until the hot water reaches the desired temperature to cause actuator 38 to push piston 44 rearward until poppet 42 engages valve seat 90 to shut-off hot water flow through hot water channel 128. thereby ending the diversion of "hot" water to the cold water channel 130. Elastomeric washer shaped diaphragm 125 acts as a check valve to prevent back flow of cold to hot when hot water line pressure is reduced. Conical washer shaped screens 129 filers detritus and other trash from passing water. Screens 129 are self-cleaning due to the high water velocities encountered when the shower valve is running hot water.

Example 2

Single Handle Faucets w/Bypass Valve in Moveable Valving

This family of valves may utilize either a moveable perforated hollow spherical ball 64, as shown in FIGS. 3 and 4, or an internally moveable valve cartridge, that have a common internal flow area to selectively and adjustably connect the hot 20 and cold 16 lines to the discharge spout 70. It is possible to place the same thermal valve system 36 (in a more compact form) inside of a replacement one inch diameter ball 134 for the moveable ball type or inside the replaceable faucet cartridges with internally moveable valving parts.

Figure 12:
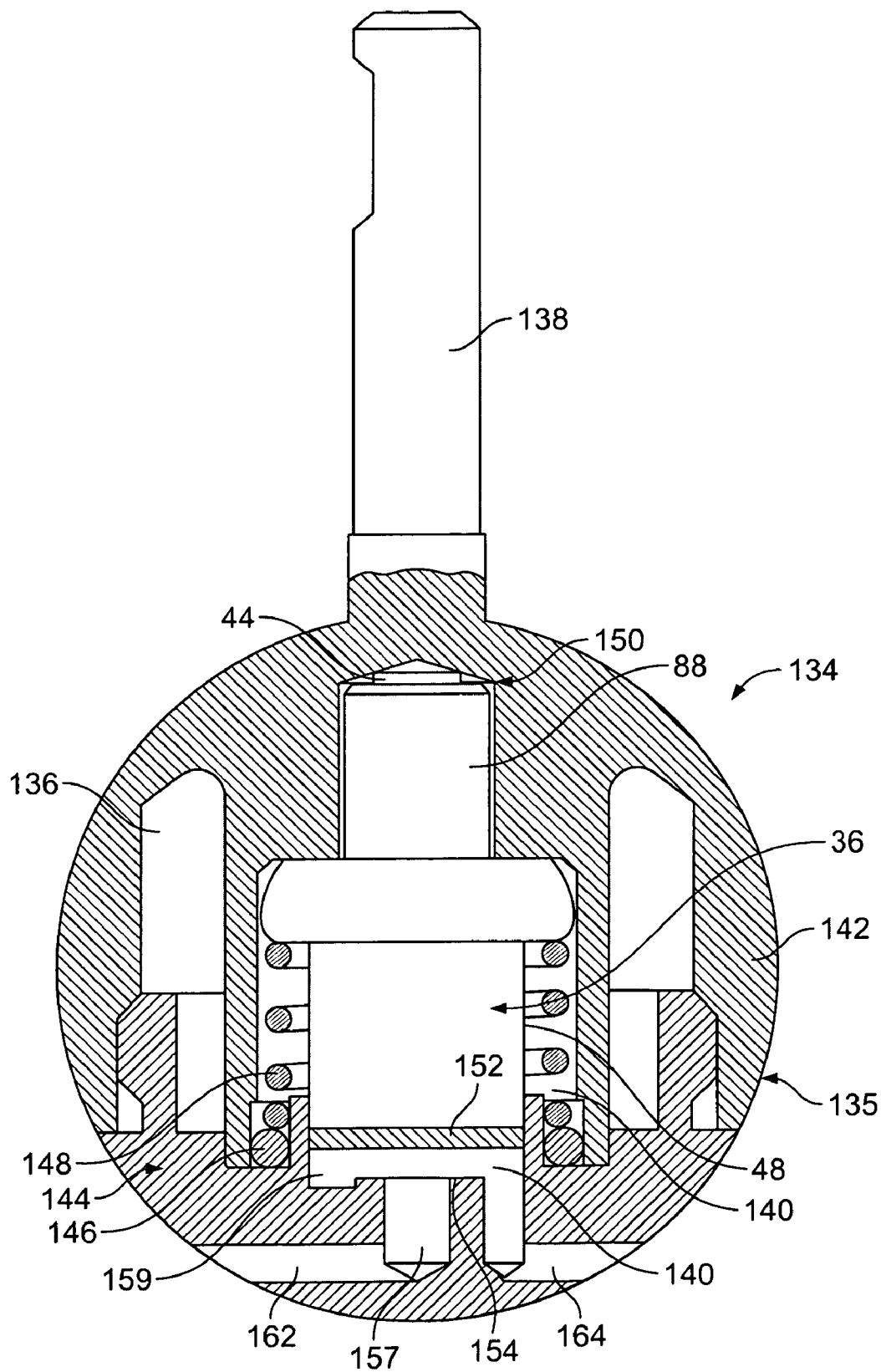
FIG. 12 is a cross-sectional view of the side of a modified ball control mechanism for use in single handle faucets.

The previous simple hollow sphere, now 134 (shown in FIGS. 12, 13 and 14), is structurally divided into two separate compartments inside ball body 135, an outer annular compartment 136, coaxial with the centerline of the actuating stem 138, and a cylindrical inner compartment 140, also coaxial with the centerline of the actuating stem 138. Passage 162, connected to annulus 159, and passage 164, connected to central bore 157, are separated by the valving action of the bypass valve 36 installed in compartment 140. Ball 134 is made in two parts, an upper half 142 and a lower half 144 (relative to the stem 138 which normally extends upward), which screw together for convenience in development work. The thermal actuator 88 is enclosed in the inner compartment 140 is the same as the actuator discussed above, but with a shortened guide length and a cut-off piston 44 with no poppet. The radially squeezed O-ring 146 seals the two halves 142 and 144 of ball 134, and is held in place by the spring 148, which also functions as the bias or return spring. The piston 44 is cut off short to conserve space, and bears on the upper end of drilled hole 150. Unlike the above-mentioned actuators, this piston 44 remains stationary and it's the thermal actuator body 48 that moves against spring 148 to push the elastomer poppet disc 152, which doubles as a check valve, against the stationary seat 154 as the valve 134 heats up.

Figure 13:
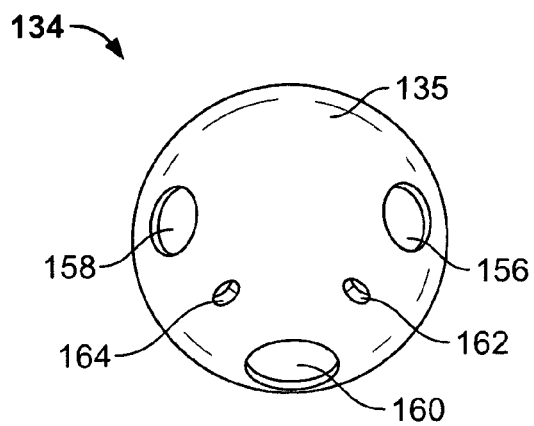
FIG. 13 is a top view of the ball of FIG. 12.
Figure 14:
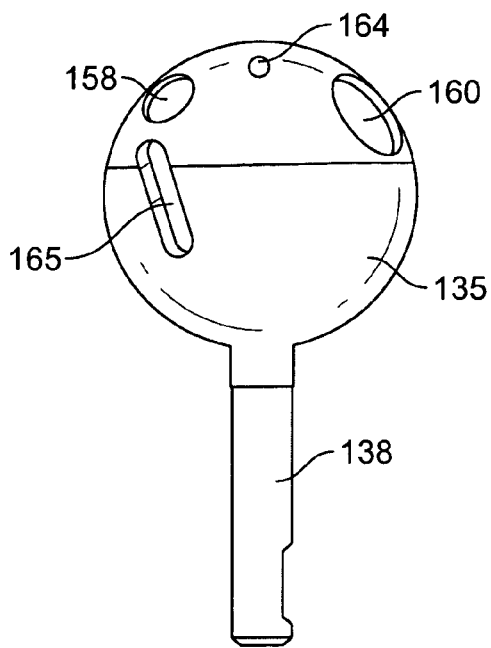
FIG. 14 is a side view of the ball of FIG. 12.

The two inlet ports on ball body 135, shown as 156 for the hot water inlet port and 158 for the cold water inlet port on FIGS. 13 and 14, selectively and adjustably communicate with the hot 20 and cold 16 lines. The ball discharge port 160 communicates in all ball positions with the faucet spout to discharge water from faucet Ports 156, 158 and 160 are located in exactly the same locations on the ball body 135 as the prior art ball 64 previously. However all three ports are connected within the ball to annular compartment 136 instead of to the entire inner volume of the hollow prior art ball 64. In the shut-off mode, the hot and cold inlet ball ports 156 and 158, respectively, of ball 134 are shifted away from the hot 20 and cold 16 lines, as with prior art ball 64. However, ball 134 includes two added small ports 162 and 164 to the unperforated spherical surface that previously blocked off the hot 20 and cold 16 lines. Ports 162 and 164 connect the hot 20 and cold 16 lines to the central bore 157 and annulus 159, which are valved by action of poppet disc 152. When the ball 134 is cold due to a cooled-off hot water line 20, the bypass valve. 36 opens, allowing communication between the annulus 159 and central bore 157. With the faucet 10 in the shut-off position, the two added ports 162 and 164 thus allow communication between a cooled-Off "hot" line 20 and the cold line 16, and consequently a flow of water from the boosted "hot" line 20 to the cold line 16. Positioning slot 165 in ball 134, also in ball 64, is used to position ball 134 in the faucet. The bypass action described above is accomplished without change to any part of the faucet 10 except the replaceable valving ball 134. It is thus very easy to retrofit an existing faucet to the bypass function by simply replacing the existing "standard" design hollow ball 64 with the new ball 134, as described.

There are several major advantages to this arrangement. These advantages include: (1) the complete ball 134 is easily replaced to fix a malfunctioning bypass valve 36; (2) for retrofit, the original ball 64 can be removed and replaced with the new valve-in-ball 134. No other changes need be made to the existing faucet 10 (however, a booster pump 26 located near the hot water heater 18 in the hot water line 20 does of course need to be installed). This is particularly advantageous where it would be very difficult or impractical to replace an existing complete faucet valve, such as a shower valve installed behind a tiled wall.

While the hollow ball 64 of the Delta faucet (and other clone faucets) provides an adequate space in a convenient location for installation of the bypass valve 36, a miniaturized version of the bypass valve 36 can also be fitted into the replaceable cylindrical valving cartridges of other brands of single handle faucets with an action characterized by oscillating movement about a vertical centerline to adjust water temperature. Such a valving action to control mixing is commonly used in Price-Pfister, Sterling, American Standard, Moen, and Kohler faucets, among others. These faucets use a push-pull or tipping lever action to operate the on-off function within the same (usually) cylindrical cartridge. On some configurations, it is likely that space would have to be made by lengthening these cylindrical faucet cartridges, which would in turn call for a compensating change to the faucet central housing.

Figure 15:
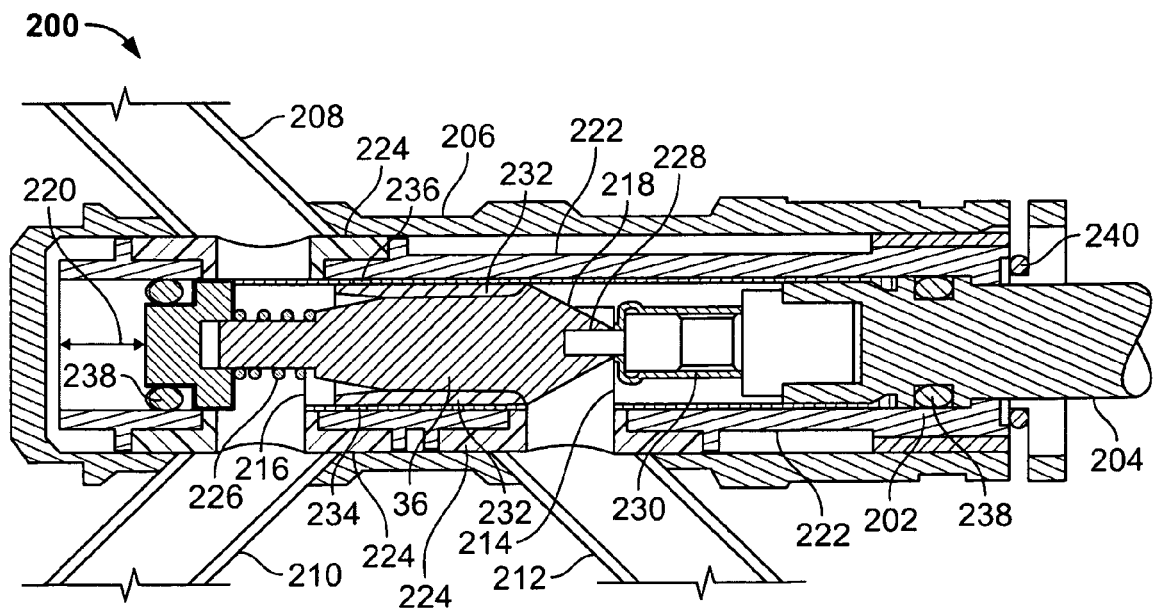
FIG. 15 is a cross sectional view of modified replaceable cylindrical valving cartridge used in some faucets as adapted for the present invention.

FIG. 15 shows a modification of a widely used Moen designed faucet 200 as an example of a fixture that utilizes a replaceable cylindrical valving cartridge 202. The modifications to the faucet 200 include adding a hot water bypass valve 36 within the moving valving spool 204 of the Moen design. This valve design is of the type wherein on/off and metering adjustment is accomplished by axial motion of the center spool 204 (off is all the way inward). Hot/cold mixing adjustment is by angular positioning of the center spool 204 when it is wholly or partially pulled out to the on position. The faucet 200 typically has a brass housing 206 connected to the cold water inlet 208 and hot water inlet 210. A spout connection 212 allows water to exit the fixture 200. FIG. 15 shows the spool 204 in its outward or "full on" position (slot 214 axially aligns with spout port 212 and slot 216 axially aligns with cold 208 and hot 210 inlet ports) and angularly rotated so that the hot port 210 is open to slot 216 but cold port 208 is blocked off.

In the position shown in FIG. 15, hot water from port 210 can enter through slot 216 to the interior of tubular spool 204 and proceed through hollow shuffle 218 to slot 214 and exit out spout port 212. Arrows 220 indicate the length of travel of the spool 204. Tubular member 222 is a stationary (preexisting) sleeve incorporated within the housing 206 to allow placement and retention of the three elastomer seals 224 to bear against and dynamically seal with spool 204. It also provides a vent path around its exterior for the space at the "bottom" of the valve 200 to allow axial (piston) motion of spool 204 without encountering hydraulic lock. Spool 204 is shown in a simplified one-piece configuration for clarity.

The bypass valve 36 components (consisting of bias spring 226, shuttle 218, actuator piston 228 and actuator 230) are enclosed within the tubular portion of spool 204. Shuffle 218 is located (floats) between bias spring 226 and actuator 230. Shuffle 218 has a central cruciform shaped member with an integral elastomer sleeve 232 attached to the four legs of the cruciform. Four axial passages within the sleeve 232 and around the cruciform are thus provided. This elastomer sleeve 232 is in contact with and seals against the inner surface of tubular spool 204. When thermal actuator 230 is heated to its actuation temperature, it "suddenly" extends piston 228 outward, moving shuttle 218 (to the left in FIG. 15) against bias spring 226.

Two bleed holes 234 and 236 are so located through the wall of tubular spool 204 as to line up with hot water inlet 210 and cold water inlet 208, respectively, when the manually operated spool 204 is pushed all the way into housing 206 (the off position). Further, bleed hole 236 is axially located slightly closer to the bias spring end of spool 204. 0-rings 238 seal spool 204 and retaining clip 240 holds sleeve 222 within housing 206.

In FIG. 15, the bypass valve 36 components are shown in their "cold" positions. Hot bleed hole 234 is covered by the end of the elastomer sleeve 232 on shuttle 218, but cold bleed hole 236 is uncovered. With spool 204 pushed all the way in (off position) bleed hole 234 communicates with hot water inlet 210 and boosted hot water pressure communicates through hot bleed hole 234. this pressure deflects elastomer sleeve 232 inward locally to allow flow from the boosted hot water line 20 (presumably cooled off from a period of disuse) into the interior of tubular spool 204 and out through uncovered cold bleed hole 236, which by virtue of the spool 204 being in the off position is in communication with cold water inlet 208. A bypass of cooled off water from the hot water line 20 to the cold water line 16 is thus accomplished.

When sufficient cooled off water has passed through the valve 200 to bring "hot" water to and through the valve 200, actuator 230 will be warmed to its actuation temperature and will expand, forcing shuffle 218 against bias spring 226. This axial movement will result in elastomer sleeve 232 covering cold bleed hole 236. Boosted hot water pressure internal to sleeve 232 will hold sleeve 232 outward against the inner wall of tubular spool 204, effectively sealing bleed hole 236, and stopping the bypass flow until the valve cools down, causing bias spring 226 to force shuttle 218 back against piston 10 into contracting actuator 230, again opening cold bleed hole 236.

The elastomer sleeve 232 has a second function, that of acting as a check valve. When any faucet in the plumbing system Is opened, the resulting flow may induce a substantial pressure drop in the associated plumbing line (either hot 20 or cold 16, depending on which faucet was opened). If a bypass valve 36 is open at such a time, such a pressure difference may cause sufficient water to leak through so as to constitute a nuisance. If the lowered pressure is on the hot water line 20, no "leak" will occur as the higher pressure of the cold water inside the sleeve 232 will hold it against the inner wall of tubular spool 204 in the vicinity of hot bleed hole 234, effecting a seal. If the lowered pressure is on the cold side, the valve 200 will allow cooled off water from the hot water line 20 to bypass into the cold water line until warm water arrives at the valve 200, at which time the shuttle 218 will shift and cut off the bypass.

Example 3

Dual Handle, Single Spout Faucets

Although two handle, single spout faucets might have been expected to fade out of demand in favor of the more convenient single handle faucets, the two handle faucets (shown as 10 in FIG. 1) seem more amenable to elegant cosmetic design than their single handle cousins, which have an inherently more utilitarian look. Apparently for this reason, most double handle faucets on display are for lavatory use. The same requirements for ease of maintenance by allowing access to the bypass valve 36 from the top apply to this faucet type. It is convenient that the prior art faucet design utilizing a rotating threaded stem with a faucet washer and a hard seat has become a thing of the past, as the newer designs with replaceable cartridges are more adaptable to this modification.

Figure 16:
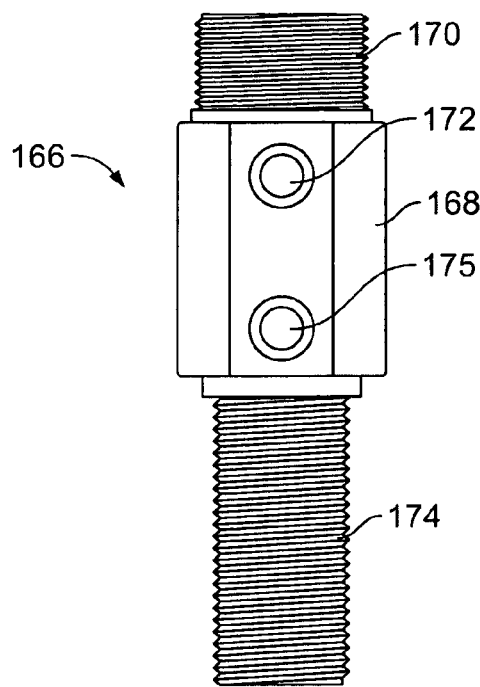
FIG. 16 is a side view of a valve member used with dual handle, single spout faucets.

Most modern two handle faucets utilize a cartridge design in a pair of valve member 166, shown in FIG. 16, wherein the valving function is accomplished within the cartridge that is positioned inside the housing section 168 of valve member 166. This allows complete re-conditioning of the faucet by simply replacing a single assembly on each side. These cartridges are accessible in the housing section 168 from the top by removing the faucet handles and bonnets that attach to the upper threaded portion 170. The cartridge assembly then simply lifts out, exposing its open cavity inside housing section 168, with a side port 172 leading to confluence with the like port from the other side of the faucet, which confluence flows on through the single spout of such faucets. Below the mentioned cavity for the faucet valving cartridge there is an open one-half inch (typically) threaded pipe 174 for the hot or cold conduit into the faucet. This externally threaded pipe is substantially longer than needed for valving or connection purposes to allow for overly thick lavatory counters and to get the lower end of these threaded pipes far enough down behind the sink for reasonable access by the installer. This "extra" space on the hot water side is a top accessible, hydraulically appropriate place to locate a thermal valve cartridge similar to the type described for inclusion in or adjacent to the hot water conduit in the central housing 62 of a single handle faucet. Side port 175 is added to housing section 168 and a line is run to a like port on the other, opposing faucet. Addition of a thermal bypass valve 36 requires additional machining and the addition of a bypass line connecting the hot and cold lines. An existing two handle single spout valve thus could not be retrofitted, but modifications to the design are relatively minor and the existing replaceable valve cartridge would fit the new design.

The major difference of concern in this matter between single handle single spout and two handle single spout faucet designs is that in the single handle central block, it is possible to create the connecting passages (bypass) by simply drilling cross holes, as discussed above. With two separate hot and cold faucet valves located four inches apart, some kind of cross conduit for the bypass must be added. There seem to be two approaches to directing the water from the hot and cold faucets to a confluence and out to the single spout. American-Standard, Oasis, La Bella and some Price-Pfister's use a large brass casting that includes the spout, both hot and cold faucet housings, and a cored cast passage connecting all of this together. Adding a thermal bypass valve 36 to such a two handle faucet set would require the addition of an additional cored cast passage to accomplish the bypass function between hot and cold lines. Delta, Moen, Kohler, and some Price Pfister two handle single spout valves use brazed-in copper tube manifolds instead of cored cast passages. These would require the addition of a tubular cross passage brazed in. The Delta two handle single spout valve has a somewhat different valving action which makes it much more difficult to fit in a thermal valve cartridge. This new passage (cored or brazed tubular) needs to connect to the vertical hot and cold "pipe" members below their existing side port to the spout. These faucet sets generally do not have sufficient vertical space under the polished bezel to accommodate the extra passage. This will require addition of some vertical length to the skirt of the valve bezel.

Figure 17:
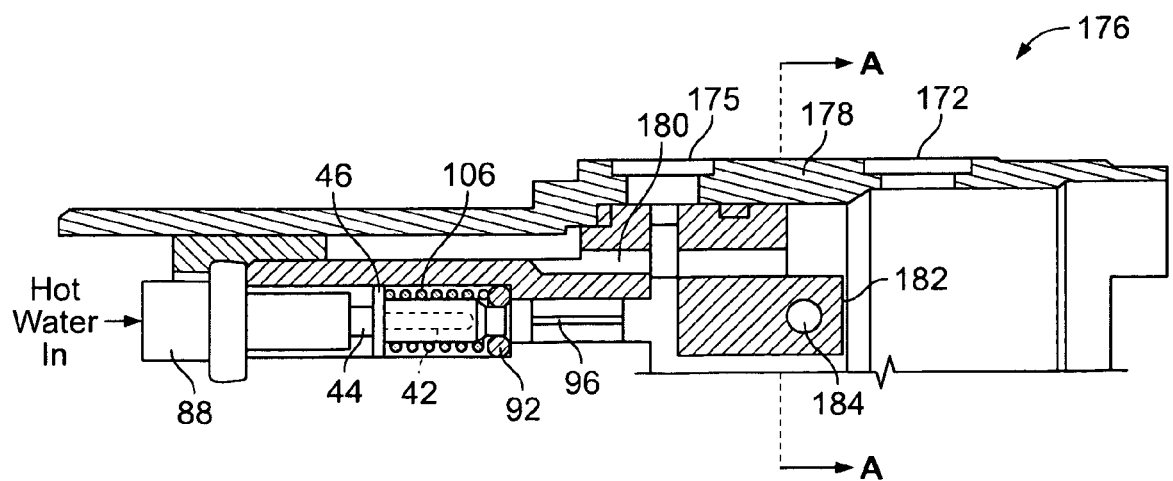
FIG. 17 is side cross-sectional view of the upper half of a cartridge placed in the valve member of FIG. 16.

FIG. 17 shows a modified "hot" side of a Kohler two handle faucet 176, with the housing shown as 178. The housing 178 is identical to the standard existing Kohler housing 178 above (to the right of) line AA. The housing 178 must be bored out in several steps to accommodate the new thermal valve cartridge 180, which can be a molded plastic cartridge identical in function to that already described for the center block of the Delta single handle valve, It varies from the previously described cartridge in the configuration of the passage to bring the hot water past the thermal valve 36 to the faucet, and the configuration of the snap fit for the thermal actuator 88. It also has an upper extension 182 with a through hole 184. The extension 182 fits into a recess in the bottom of the existing Kohler faucet cartridge and the through hole 184 is for engagement of a hook to allow removal of the thermal valve cartridge 180 for replacement of the thermal bypass valve 36.

Figure 18:
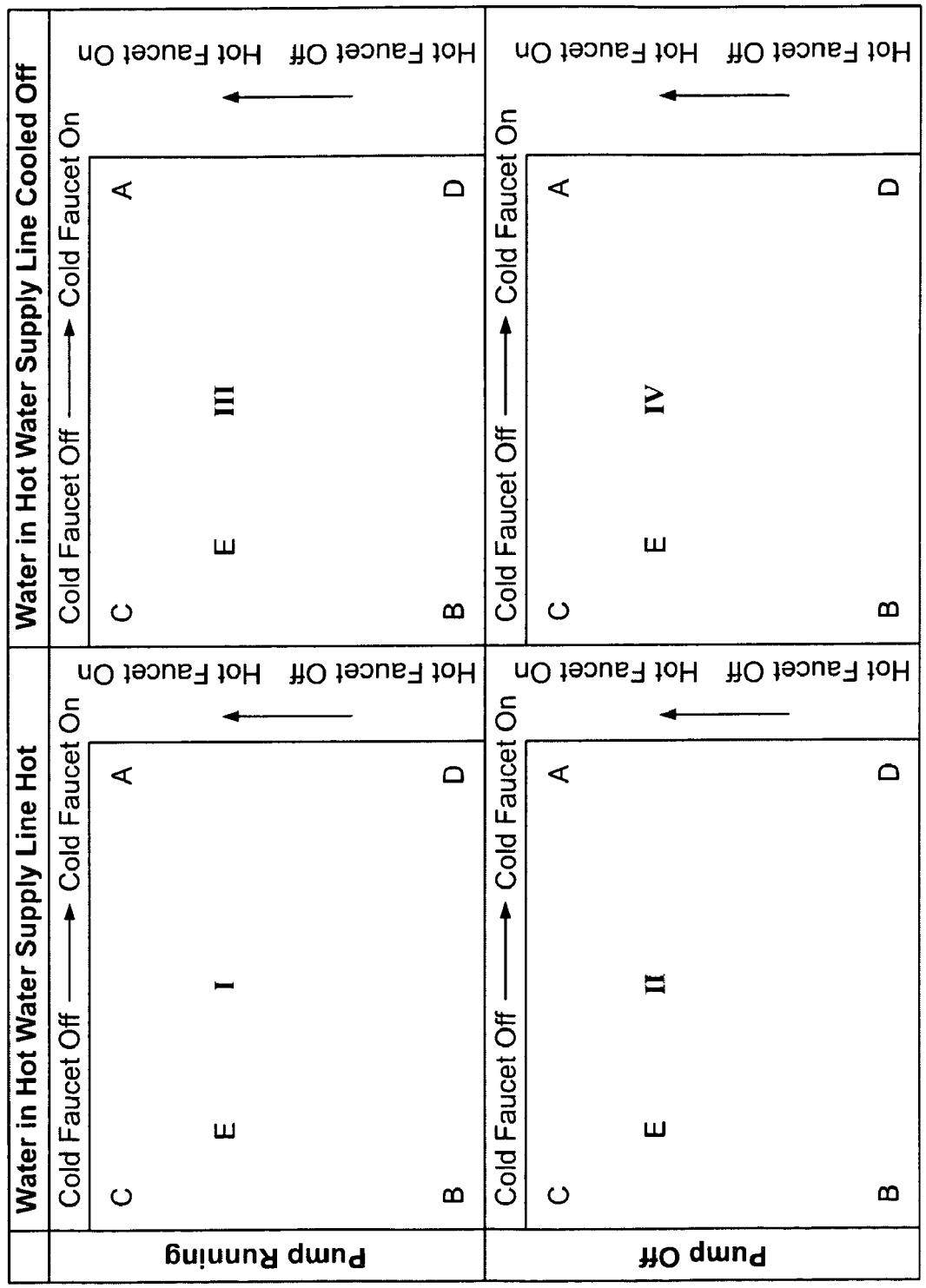
FIG. 18 is chart showing the operational characteristics of the bypass valve of the present invention when in use with a water distribution system.

The operation of the bypass valve 36 inside of faucet 10 of the present invention is summarized on the chart shown as FIG. 18 which indicates the results of the twenty combinations of conditions (pump on/pump off; hot water line hot/hot water line cooled off; hot faucet on, or off, or between; cold faucet on or off, or between) that are applicable to the operation of valve 36. The operating modes IVB, IVC, IVD, IIIB, & IIID are summarized detailed in the immediately following text The operation of the remaining fifteen modes are relatively more obvious, and may be understood from the abbreviated indications in the outline summarizing FIG. 18. Starting with the set "off hours (normal sleeping time, and daytime when no one is usually at home) pump 26 will not be powered. Everything will be just as if there were no pump 26 and no bypass valve 36 installed in faucet 10 (i.e., both the cold and hot water lines will be at the same city water pressure). The hot water line 20 arid bypass valve 36 will have cooled off during the long interim since the last use of hot water. The reduced temperature in the valve results in "retraction" of rod member 40 of the thermally sensitive actuator 88. The force of bias spring 106 pushing against flange 46 on rod member 40 will push it back away from valve seat 90, opening valve 36 for recirculation. Although the thermal actuating element 88 is open, with pump 26 not running, no circulation flow results, as the hot 20 and cold 16 water piping systems are at the same pressure. This is the mode indicated as IVB in the outline on FIG. 18. If the cold water valve at faucet 10 is opened with the thermal element 88 open as in mode IVB above, pressure in the line 16 to the cold water side of faucet 10 will drop below the pressure in the hot water line 20. This differential pressure will siphon tepid water away from the hot side to the cold side, which is the mode indicated as IVD in the outline on FIG. 18. The recirculation of the "hot" water will end when the tepid water is exhausted from the hot water line 20 and the rising temperature of the incoming "hot" water causes the thermal element 88 to close.

If the hot water valve is turned on with the thermal element 88 open as in mode IVB above, pressure in the line 20 to the hot water side of faucet 10 will drop below the pressure in the cold water line 16. This differential pressure, higher on the cold side, will load check valve 96 in the "closed" direction allowing no cross flow. This is mode IVC in the outline on FIG. 18. In this mode, with the hot water line 20 cooled and the pump off, a good deal of cooled-off water will have to be run just as if valve 36 were not installed), to get hot water, at which time the thermal element 88 will close without effect, and without notice by the user. With the thermal element 88 open and the hot water line 20 cooled-off as in mode IVB above, at the preset time of day (or when the cyclic timer trips the next "on" cycle) the pump 26 turns on, pressurizing the water in the hot side of faucet 10. Pump pressure on the hot side of faucet 10 results in flow through the open thermal element 88, thereby pressurizing and deflecting the check valve 96 poppet away from its seat to an open position. Cooled-off water at the boosted pressure will thus circulate from the hot line 20 through the thermal element 88 and check valve 96 to the lower pressure cold line 16 and back to water heater 18.

This is the primary "working mode" of the bypass valve 36 and is the mode indicated as IIIb in the outline on FIG. 18. If the cold water valve is turned on during the conditions indicated in mode IIIB above (i.e., pump 26 operating, hot line 20 cooled off, the hot valve at faucet 100ff) and while the desired recirculation is occurring, mode IIID will occur. A pressure drop in the cold water line 16 due to cold water flow creates a pressure differential across valve 36 in addition to the differential created by pump 26. This allows tepid water to more rapidly bypass to the cold water inlet 22 at faucet 10. When the tepid water is exhausted from the hot water line 20, thermal element 88 will close, ending recirculation.

Explanation of FIG. 18 Table

Mode I: Water in Hot Water Supply Line Hot, Pump On.
    A. Hot and cold faucet valves full open
        Pressure drops from hot and cold flow about equal. Actuator element 26 stays closed. No leak or recirculation in either direction.
    B. Hot and cold faucet valves fully closed
        Thermal actuator 88 keeps valve 36 closed. No recirculation.
    C. Hot faucet valve fully open, cold faucet valve closed
        Actuator element 88 closed. Check valve 96 closed. No recirculation. No leak.
    D. Hot faucet valve closed, cold faucet valve fully open
        Actuator element 88 closed. No recirculation. No leak.
    E. Hot and cold faucet valves both partially open in any combination
        Actuator element 88 closed. No recirculation. No leak.

Mode II: Water in Hot Water Supply Line Hot, Pump Off.
    A. Hot and cold faucet valves full on
        Pressure drops from hot and cold flow about equal. Actuator element 88 stays closed.
    B. Hot and cold faucet valves fully closed
        Thermal actuator 88 keeps valve 36 closed. No recirculation.
    C. Hot faucet valve fully open, cold faucet valve closed
        Thermal actuator 88 closed. Check valve 96 closed. No recirculation. No leak.
    D. Hot faucet closed, cold faucet fully open
        Thermal actuator 88 closed. No recirculation. No leak.
    E. Hot and cold faucets both partially open in any combo
        Thermal actuator 88 closed. No recirculation. No leak.

Mode III: Water in Hot Water Line Cooled Off, Pump On.
    A. Hot and cold faucet valves full open
        Flow-induced pressure drops about equal, valve 36 stays open and allows recirculation hot to cold until tepid water is exhausted and hotter water closes thermal actuator 88. If both faucet valves are at same sink, they are mixing hot and cold anyway. If faucet valves being manipulated are at remote sinks on the same plumbing branch, this short time tepid-to-cold leak will probably not be noticeable. If faucet valves being manipulated are on remote branches of plumbing, the mixing would have no effect.
    B. Hot and cold faucet valves fully closed
        Thermal actuator 88 open, get desired tepid-to-cold recirculation until hot line heats up.
    C. Hot faucet valve fully open, cold faucet valve closed
        Thermal actuator 88 open but pressure drop in hot line may negate pump pressure, stopping recirculation. Check valve 96 stops cold to hot leak.
    D. Hot faucet valve closed, cold faucet valve fully open
        Thermal actuator 88 open, get tepid to cold recirculation until hot line heats up.

E. Hot and cold faucets both partially open in any combination

Could get tepid to cold leak. If faucet valves at same sink don't care as mixing hot and cold anyway. If at remote sinks probably not noticeable. Tepid to cold leak would be short term.

Mode IV: Water in Hot Water Supply Line Cooled Off, Pump Off.

A. Hot and cold faucet valves full open

Flow-induced pressure drops about equal, valve 36 stays open and may allow recirculation (leak) hot to cold until tepid water is exhausted and hotter water closes thermal actuator 88. Don't care, if both faucets are at same sink as are mixing hot and cold anyway. If faucet valves being manipulated are at remote sinks on the same plumbing branch, this short time tepid-to-cold leak would probably not be noticeable. If faucets being manipulated are on remote branches of plumbing, mixing would not be noticeable.

B. Hot and cold faucet valves fully closed

Thermal actuator 88 open, no recirculation.

C. Hot faucet valve fully open, cold faucet valve fully closed

Thermal actuator 88 open. Check valve 96 closed. No leak

D. Hot faucet valve closed. Cold faucet valve fully open

Valve 36 open, tepid to cold recirculation until thermal actuator 88 heats up and closes.

E. Hot and cold faucet valves both partially open, in any combo

Could get tepid to cold leak. If faucet valves at same sink, don't care as mixing hot and cold anyway. If at remote sinks probably not noticeable. Tepid to cold leak would be short term.

Figure 19:
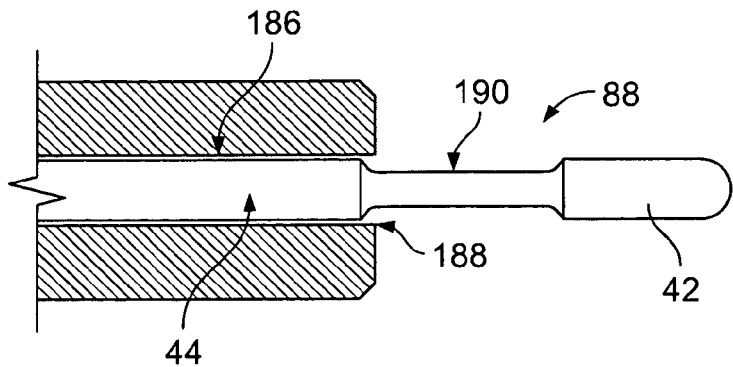
FIG. 19 is a side cross-sectional view of a modified thermal actuator showing modifications to reduce problems with lime buildup.

Several further enhancements have been developed for the thermal valve actuator 88, which are applicable to all of the above-described faucets are shown in FIG. 19. It has been noted that "lime" or "calcium" buildups on the piston 44 can cause sticking of the piston 44 in the actuator 88. Manufacturers of these thermal actuators 88 recommend use of an elastomer boot or a nickle-teflon coating on the piston 44, or use of a plastic piston 44. A preferred material may be use of a plastic piston 44, to which the buildup could not get a tenacious hold, and the removal of the internal chamfer at the open end of guide bore 186 and replacement with a sharp corner 188, as shown in FIG. 19. Removal of the chamfer and replacement with corner 188 would provide a sharper scraping edge to clean the piston 44, and would eliminate a place where the detritus could become wedged. In addition to the chamfer removal, another simple geometry change to the piston 44 might be very effective. As shown in FIG. 19, a long shallow groove 190 in or a reduced diameter of piston 44 that would extend from just inside the guide bore 186 (at full extension) to just outside the guide bore 186 at full retraction would provide a recess to contain buildup for a long period. Once this recessed area filled up with lime, the edge 188 of guide bore 186 could scrape off the incrementally radially extending soft build up relatively easily, as compared to scraping off the surface layer that bonds more tenaciously to the metal.

The most direct method to overcome sticking due to mineral buildup is to optimize actuator force in both directions. Buildup of precipitated minerals on the exposed outside diameter of the extended piston 44 tends to prevent retraction, requiring a strong bias spring 106. This high bias spring force subtracts from the available extending force however, thereby limiting the force available to both extend the piston 44 against the mineral sticking resistance and to effect an axial seal between poppet and seat.

When water temperature is high, the piston 44 is extended so that its surface is exposed. Deposition also occurs primarily at high temperatures, so that buildup occurs on the piston outside diameter, resulting in sticking in the extended position when the growth on the piston outside diameter exceeds the guide 186 interior diameter. Significantly more than half of the available actuator force thus can most effectively be used to compress the bias spring 106, resulting in a maximum return force.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

Figure 20:
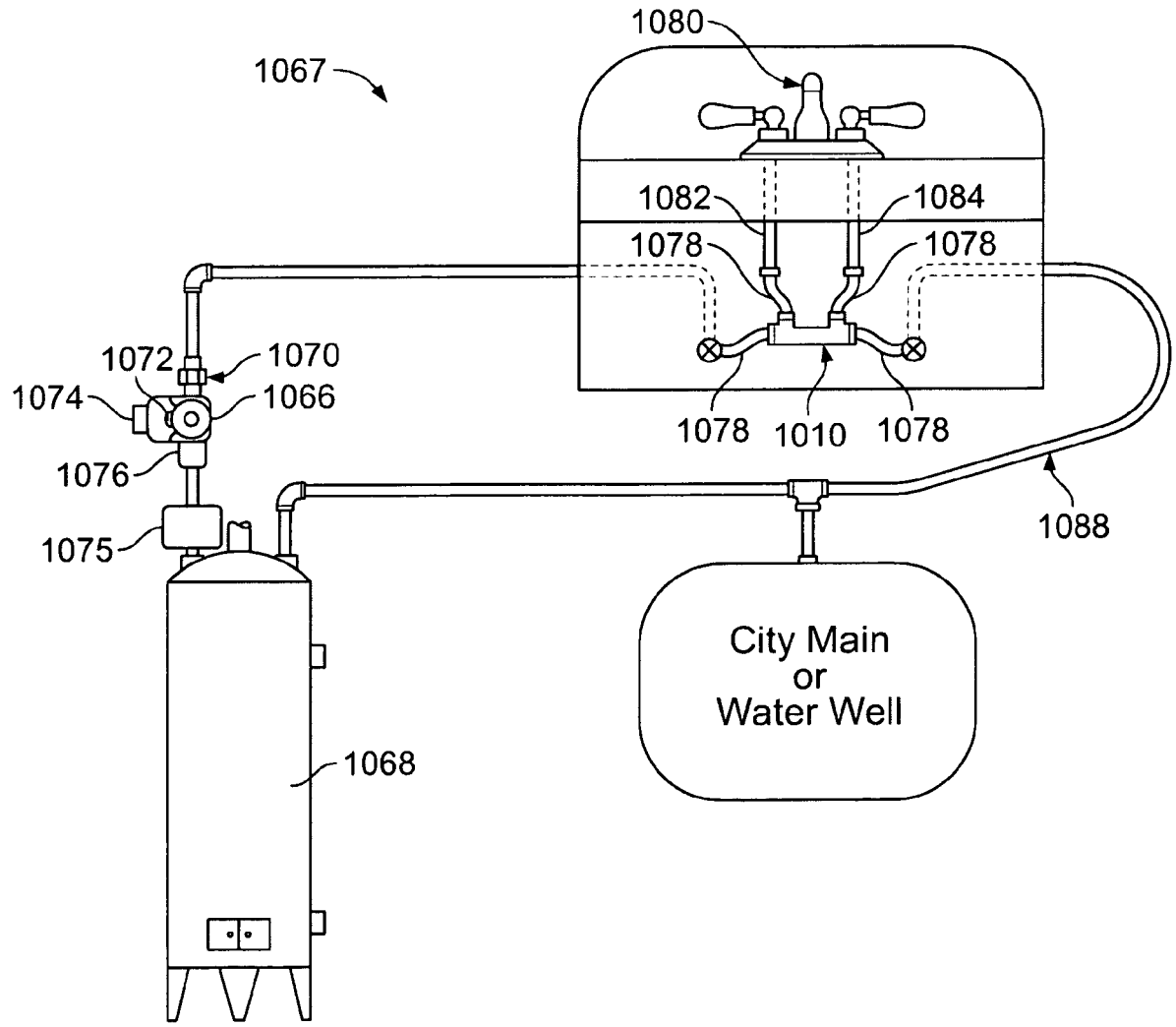
FIG. 20 is a side elevation view showing a water circulation system and fixture utilizing a bypass valve in accordance with an exemplary embodiment.

FIG. 20 is a side elevation view showing a water circulation system 1067 and fixture 1080 utilizing a bypass valve 1010 in accordance with an exemplary embodiment. In order to achieve the desired circulation flow, a single circulating pump 1066 is utilized as part of the water circulating system 1067. Pump 1066 can be a single, small pump of the type used in residential hot water space heating. To avoid reduced flow, a check valve 1070 can be plumbed in parallel with pump 1066 or incorporated within the pump housing, to pass a flow rate exceeding the pump's capacity around pump 1066. When pump 1066 is powered and flow demand is low, check valve 1070 prevents the boosted flow from re-circulating back to its own inlet. With check valve 1070 plumbed around pump 1066, it is advantageous to place an orifice 1072 in the pump discharge to provide a simple manner to achieve the desired very steep flow-head curve from available stock pump designs. A single pump 1066 located at or near the water heater 1068 in its discharge piping will boost the pressure in the hot water pipes somewhat above that in the cold water pipes (i.e., perhaps one to three feet of boost). With this arrangement only one pump 1066 per plumbing system (i.e., per water heater) is required with any reasonable number of remote faucet sets (i.e., the typical number used in residences) equipped with bypass valves 1010. This is in contrast to those systems that require multiple pumps, such as a pump at each fixture where bypassing is desired.

In one embodiment, pump 1066 may operate twenty-four hours a day, with most of the time in the no flow mode. However, this is unnecessary and wasteful of electricity. Alternatively, pump 1066 can have a timer 1074 to turn on the pump 1066 daily at one or more times during the day just before those occasions when hot water is usually needed the most (for instance for morning showers, evening cooking, etc.) and be set to operate continuously for the period during which hot water is usually desired. This still could be unnecessary and wasteful of electricity. Another alternative is to have the timer 1074 cycle pump 1066 on and off regularly during the period when hot water is in most demand. The "on" cycles should be of sufficient duration to bring hot water to all remote fixtures that are equipped with a bypass valve 1010, and the "off" period would be set to approximate the usual time it takes the water in the lines to cool-down to minimum acceptable temperature. By using a time-of-day control timer 1074, pump 1066 operates to maintain "instant hot water" only during periods of the day when it is commonly desired.

During the off-cycle times, the plumbing system operates just as if the bypass valves 1010 and pump 1066 were not in place. This saves electrical power usage from pump operation and, more importantly, avoids the periodic introduction of hot water into relatively uninsulated pipes during the off-hours, thereby saving the cost of repeatedly reheating this water. The time-of-day control also avoids considerable wear and tear on pump 1066 and the bypass valves 1010. Considerable additional benefits are gained by using a cyclic timer 1074, with or without the time-of-day control.

Optionally, a switch 1076 may be provided within the water circulation system 1067 to detect flow characteristics of water within the water circulation system 1067, such as in the supply pipes. The switch 1076 may be used with or without the timer 1074 to control the operation of the pump 1066. The switch 1076 may be located at the pump 1066 or the switch 1076 may be located elsewhere in the system, such as at the fixture, at the cold water pipe, at the hot water pipe, at the water heater, and the like. The switch may be sized to detect significant flows only (e.g., those flows that are much larger than the bypass valve 1010 flows), such as a shower flowing. Optionally, the switch 1076 may constitute a flow sensor that operates to detect a flow characteristic of actual flow of water through the pipes. Alternatively, the switch 1076 may constitute a pressure sensor that operates to detect a flow characteristic of either a pressure value at a particular point within the water circulation system 1067, or a change in pressure within the water circulation system to detect flow. Alternatively, the switch 1076 may constitute a temperature sensor that operates to detect a flow characteristic of temperature, such as a change in temperature to detect flow of water through the water circulation system 1067. Alternatively, the switch 1076 may constitute a manually activated switch, a motion detector, a photo-detector, a noise detector, an infrared sensor, or an appliance activation sensor for activating the pump 1066. When a cyclic timer 1074 is used, the switch 1076 may be wired in series with the pump motor, and the switch 1076 may prevent the motor from starting if an existing flow is detected at the moment the timer calls for pump on. The use of such a switch 1076 accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 1070 required with a "small" pump.

In alternative embodiments, the water circulation system 1067 may also include at least one temperature sensor 1075 coupled to the pipes of the water circulation system for providing temperature feedback to the pump 1066. The operation of the pump 1066 may be controlled by the temperature sensor 1075, such as by turning the pump 1066 on when the temperature of the water reaches a predetermined threshold, or alternatively, falls by a predetermined amount or at a predetermined rate. Similarly, the pump may be turned off when the temperature of the water reaches a predetermined threshold, or alternatively, rises by a predetermined amount or at a predetermined rate. In another alternative embodiment, the pump 1066 may be controlled based on the flow of water within the water circulation system 1067. For example, by using the switch 1076 as a flow detector (e.g. a flow sensor, a pressure sensor, a temperature sensor, and the like), the operation of the pump 1066 may be controlled based on flow characteristics of the water in the water circulation system 1067. Alternatively, the switch 1076 may be located at another position within the water circulation system 1067, such as remote from the pump 1066.

Installation of the bypass valve 1010 may be made easy by manufacturing the valve 1010 with a single piece valve body having four ports to allow installation with commonly used under-sink (as an example) vinyl hoses or flexible metal pipe, shown as 1078 in FIG. 20, having swivel ends and faucet washers. The inlet ports may be formed with one-half inch straight pipe threads to allow the installer to remove the end of the wall shut off-to-faucet hoses (hot and cold) at the faucet 1080 and connect those ends, which are commonly one-half inch straight pipe threads, to inlets of the bypass valve 1010. Discharge ports of the bypass valve 1010 may be similarly molded with one-half inch straight pipe threads to allow connection from them to the hot 1082 and cold 1084 inlets at faucet 1080. The threads on all four ports will seal with hose washers and swivel nuts. Because the use of a plastic valve body is envisioned, the inability to mount valve body directly to "hard" plumbing with taper pipe threads insures that the body will be connected only with flexible lines 1078, thereby precluding any plumbing loads that might overstress the non-metallic body. Because all current American faucets 1080 are equipped with one-half inch straight pipe threads, the recommended procedure is to remove the pair of existing connection hoses 1078 from the faucet 1080 and connect these loose ends to the appropriate inlet ports of valve body. The angle stop valves at the wall may have any of several possible thread size connections, or may have permanently connected hoses or tubes. As a result, it is best not to disturb these wall connections, but instead use hoses 1078 to connect from the angle stop to bypass valve 1010. A new set of hoses 1078 with one-half inch straight pipe thread swivel nuts at both ends can then be connected from discharge ports 1020 and 1024 of valve body 1012 to the appropriate hot 1082 and cold 1084 water connections on faucet 1080. Other interconnection methods may also be sued to interconnect the bypass valve 1010 with the hot and cold supply lines and the fixture 1080.

Figure 21:
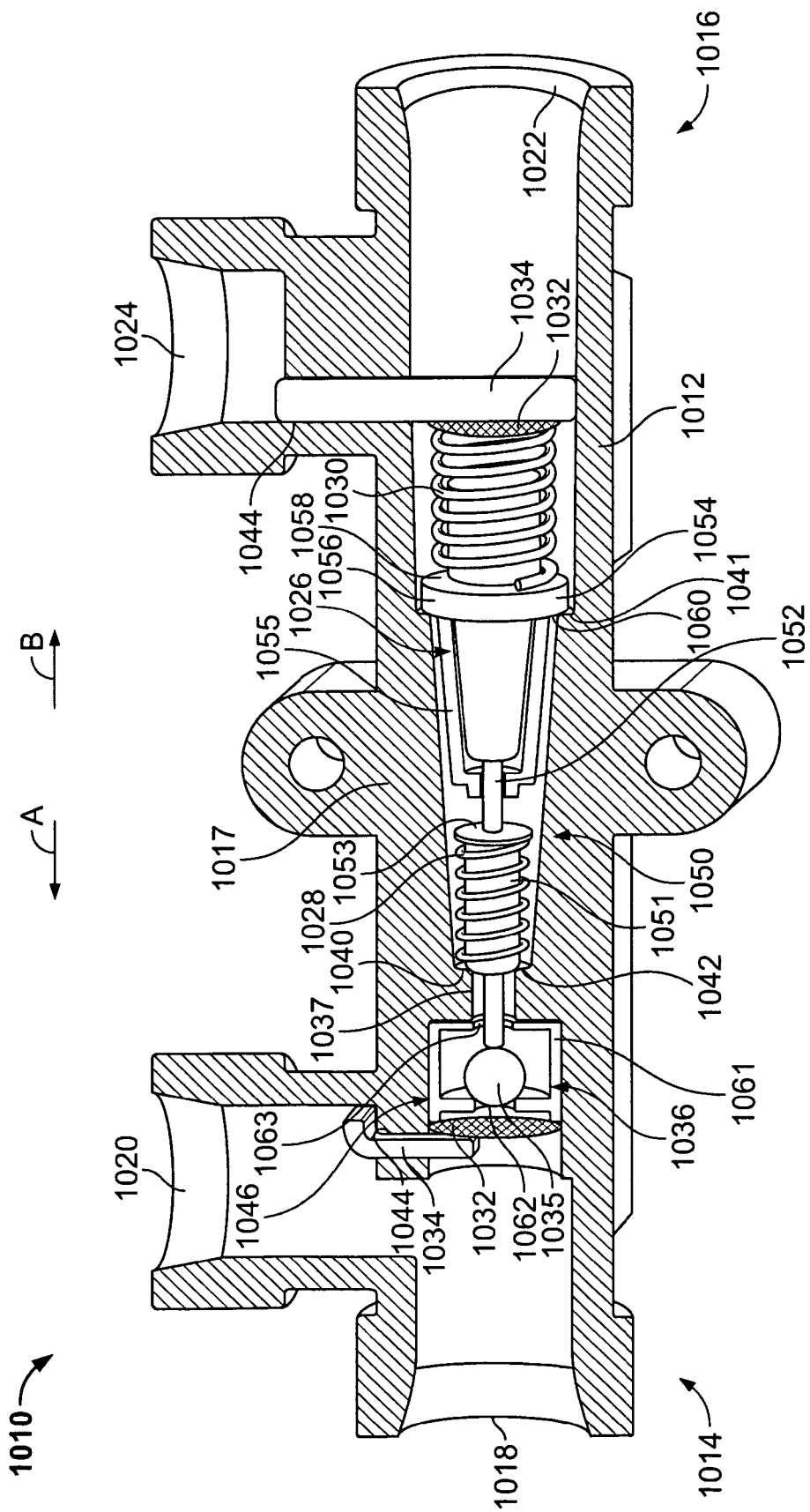
FIG. 21 is a side elevation view of the bypass valve shown in FIG. 20 in a first state with a portion of a body of the bypass valve cutaway to illustrate the various components of the bypass valve.

FIG. 21 is a side elevation view of the bypass valve 1010 in a first state with a portion of a body 1012 of the bypass valve 1010 cutaway to illustrate the various components of the bypass valve 1010. The bypass valve 1010 is illustrated in a first or closed state in which water is restricted from flowing through the bypass valve 1010, as will be described in more detail below. Bypass valve 1010 includes the valve body 1012, which is generally tubular and includes a first end 1014, a second end 1016 and a separating wall 1017 disposed between first end 1014 and second end 1016. First end 1014 is designated to receive and discharge hot water and second end 1016 is designated to receive and discharge cold water from a source of cold water, such as a city water supply system or a local water well. Tubular valve body 1012 has four threaded ports, an axial and radial port at the first end 1014 and an axial and radial port at the second end 1016. For purposes of discussion herein, the axial ports are designated as inlet ports and the radial ports are designated as discharge ports, however, the inlet ports may be the radial ports and the discharge ports may be the axial ports, or the inlet and discharge ports may be any combination of axial and/or radial ports. In one embodiment, the bypass valve 1010 is integrated with a pump, such as the pump 1066 described above, and the integrated pump/bypass valve unit is provided in the circulation system 1067, such as at a position proximate the fixture 1080.

At the first end 1014 (the hot water side) is first inlet port 1018 and first discharge port 1020 and at the second end 1016

(the cold water side) is second inlet port 1022 and second discharge port 1024. The first 1018 and second 1022 inlet ports connect to the hot and cold water distribution system and first 1020 and second 1024 discharge ports connect to the hot and cold water valves on the fixture (e.g., sink, shower, bathtub, appliance, and the like) with which the bypass valve 1010 is utilized.

Valve body 1012 houses a thermally sensitive actuating element 1026, a bias spring 1028, an over-travel spring 1030, multiple screens 1032, multiple retaining pins 1034 and a check valve 1036. Valve body 1012 can most economically and effectively be manufactured out of a molded plastic material, such as Ryton, a polyphenylene sulphide resin available from Phillips Chemical, or a variety of composites. Molded plastic materials are preferred due to their relatively high strength and chemical/corrosion resistant characteristics while providing the ability to manufacture the valve body 1012 utilizing injection molding processes with the design based on the configuration described herein without the need for expensive casting or machining. Alternatively, valve body 1012 can be manufactured from various plastics, reinforced plastics or metals that are suitable for "soft" plumbing loads and resistant to hot chlorinated water under pressure. Valve body 1012 is molded with wall 1017 having a passage 1037 therein interconnecting first end 1014 and second end 1016 to allow fluid to flow therethrough, an internal shoulder 1040 inside valve body 1012 at an end of passage 1037 for fixedly receiving and positioning one end of the bias spring 1028, an internal shoulder 1041 inside valve body 1012 for fixedly receiving and positioning one end of the over-travel spring 1030, and retaining pin holes 1044 for receiving retaining pins 1034. First end 1014 is molded with retaining slot 1046 for engagement with the check valve 1036 and one of the retaining pins 1034 is used to hold the check valve 1036 in place. The valve body 1012 is designed so the components can fit through either of the inlet and/or discharge ports, which will typically be one-half inch diameter. In this manner, a single unit bypass valve 1010 results with no intermediate or additional joints required for installation.

Optionally, thermally sensitive actuating element 1026 may be of the wax filled cartridge type, also referred to as wax motors, having a main body 1054 with a portion surrounded by a casing 1055 and an integral piston/poppet rod member 1050 extending from the main body 1054. Rod member 1050 comprises poppet 1051 attached to piston 1052 with an intermediate flange 1053 thereon. The end of poppet 1051 may seat against a valve seat 1042 to close passage 1037. Piston 1052 extends beyond the end of poppet 1051 through passage 1037 and into check valve 1036. Piston 1052 interacts with a stopper or ball 1035 housed within check valve 1036 as described in further detail below. Alternatively, rather than piston 1052 extending into check valve 1036, piston 1052 may end at a cold side of poppet 1051 and an extension arm may extend from a hot side of poppet 1051 through passage 1037 and into check valve 1036. The body 1054 of actuating element 1026 has a section 1056 of increased diameter to seat against shoulder 1041 in valve body 1012. Over-travel spring 1030 abuts against first side 1058 of actuator body 1054 and second side 1060 of actuator body abuts against shoulder 1041. Piston 1052 of rod member 1050 interconnects poppet 1051 with actuator body 1054.

Actuating element 1026 operates based on temperature. For example, Actuating element 1026 comprises a wax or a mixture of wax and metal powder (e.g., copper powder) enclosed in actuator body 1054 by means of a membrane made of elastomer or the like. Upon heating the wax or wax with copper powder mixture slowly expands, thereby pushing piston 1052 and poppet 1051 of rod member 1050 in an outward direction. Upon cooling, the wax or wax/copper powder mixture contracts and rod member 1050 is pushed inward by bias spring 1028 until flange 1053 contacts casing 1055 at actuator seat 1064, which is described in more detail below. Although other types of thermal actuators, such as bimetallic springs and memory alloys (e.g. Nitinol and the like) can be utilized, the wax filled cartridge type is illustrated in FIG. 21 because the wax can be formulated to change from the solidus to the liquid state at a particular desired temperature. The rate of expansion with respect to temperature at this change of state is many times higher, resulting in almost snap action of the wax actuating element 1026. The temperature set point is equal to a preset value, such as 97 degrees Fahrenheit, desired for the hot water. This is a "sudden" large physical motion over a small temperature change. As stated above, this movement is reacted by bias spring 1028, which returns rod member 1050 as the temperature falls.

Also inside valve body 1012 is an over-travel spring 1030, disposed between the first side 1058 of the actuator body 1054 and one of the retaining pins 1034 located inside valve body 1012 to prevent damage to a fully restrained actuator 1026 heated above the bypass valve's 1010 maximum operating temperature and to hold the actuator 1026 in place during operation without concern for normal tolerance. Over-travel spring 1030 allows movement of the actuator body 1054 away from the shoulder 1041 in the event that temperature rises substantially. Without this relief, the expanding wax would distort the casing 1055, destroying the calibrated set point. The over-travel spring 1030 also holds the bias spring 1028, rod member 1050 and actuator body 1054 in place without the need to adjust for the stack-up of axial tolerances. Alternatively, actuator 1026 can be fixedly placed inside valve body 1012 by various mechanisms known in the art, including adhesives and the like. Over-travel spring 1030 can be held in place by various internal configurations commonly known in the art, such as a molded seat. In the preferred embodiment, however, over-travel spring 1030 abuts against screen 1032, which is held in place by cantilevered retention pin 1034. Screen 1032 can be a small wire fabric, mesh-type screen that is shaped and configured to fit within the first end 1014 of valve body 1012. Screen 1032 is utilized to keep hard water lime particles and other detritus out of bypass valve 1010 and to act as a seat for the over-travel spring (as explained above).

The check valve 1036 includes a check valve body 1061 having an inlet 1062 and an outlet 1063. The inlet 1062 is positioned on the hot side of the check valve 1036 (e.g. the side facing and communicating with the hot water inlet) and the outlet 1063 is positioned on the cold side of the check valve 1036 (e.g. the side facing and communicating with the cold water inlet). Optionally, the outlet 1063 may be approximately the same size as the inlet 1062. Alternatively, the body may include an open end that defines the outlet 1063, but the open end is positioned adjacent the passage 1037. The stopper 1035 is positioned within the body 1061 between the inlet 1062 and the outlet 1063. The stopper 1035 is movable within the body 1061 to stop water flow therethrough based on a position of the stopper 1035 with respect to the inlet 1062 and the outlet 1063. The stopper 1035 is sized and shaped to fill or cover the openings defining the inlet 1062 or outlet 1063 to restrict water flow therethrough. As indicated above, a portion of the actuating element 1026 is received within the check valve 1036 for positioning the stopper 1035. In the illustrated embodiment, a portion of the piston 1052 extends into the check valve 1036 and holds the stopper against the inlet 1062. The stopper 1035 is illustrated in a closed position, wherein the stopper 1035 blocks water flow through the inlet 1062, as will be described in further detail below. When the piston 1052 is moved away, the stopper 1035 is free to move to a neutral position wherein water can flow through the inlet 1062 and into the outlet 1063. When the actuating element 1026 is in a failed state, as explained below, the stopper 1035 is able to block the outlet 1063 and prevent water flow through the outlet 1063. Optionally, the check valve 1036 may include guides for guiding the stopper 1035 along a predetermined path, such as a linear path.

In operation, the actuating element 1026 is operable in three states, namely an open state, a closed state, and a failed state. The actuating element 1026 transitions between the open and closed states based on a temperature of the water at the bypass valve 1010. For example, the body of the actuating element 1026 expands and contracts based on temperature. As indicated above, FIG. 21 represents the bypass valve 1010 in a closed state. In the closed state, the body 1054 of the actuating element 1026 is expanded within the casing 1055, thus forcing the rod member 1050 to move toward the first end 1014 of the valve body 1012, indicated by the arrow A. A portion of the piston 1052 extends into the check valve 1036 and engages the stopper 1035. In the closed position, the actuating element 1026 is actuated to an extent such that the piston 1052 forces the stopper 1035 to plug the inlet 1062 and restrict flow of water through the check valve 1036. As the body 1054 of the thermal actuator 1026 cools, the thermal actuator 1026 will, at some point, contract, and the bias spring 1028 forces the rod member 1050 to move toward the second end 1016, indicated by the arrow B. When the body 1054 contracts, the piston 1052 releases the stopper from the closed position and water will flow through the inlet 1062. This situation is described in more detail with respect to FIG. 22.

Figure 22:
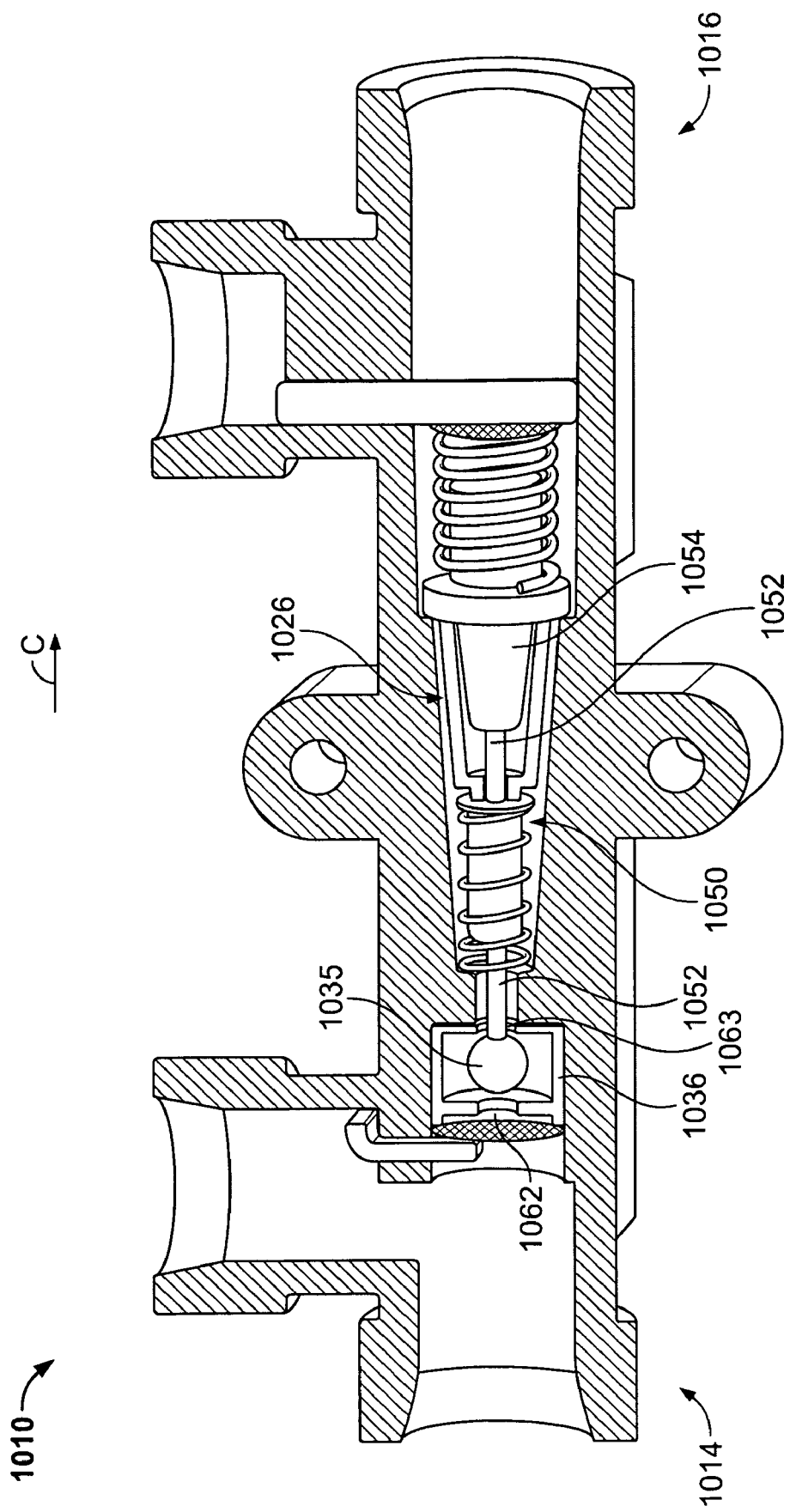
FIG. 22 is a side elevation view of the bypass valve shown in FIG. 21 in a second state.

FIG. 22 is a side elevation view of the bypass valve 1010 in a second state, wherein the bypass valve 1010 is open. In the open state, water is allowed to flow through the check valve 1036 from the inlet 1062 to the outlet 1063. The water then flows past the actuating element 1026 and into the cold water side of the bypass valve 1010. Due to the increased pressure of the water on the hot side, the water flows from the hot side to the cold side and then returns through the cold water pipes to the water heater 1068 (shown in FIG. 20). Alternatively, a separate return pipe may be provided to return the water to the water heater 1068. As indicated above, the actuating element 1026 is responsive to changes in temperature. When the temperature of the water surrounding the actuating element 1026 is decreased, the body 1054 of the actuating element 1026 contracts, thus moving the rod member 1050 in the direction of the cold side of the bypass valve 1010, indicated by the arrow C.

Under normal operating conditions, the contraction of the body 1054 moves the rod member 1050 to the open position, wherein the end of the piston 1052 is positioned within the check valve 1036 such that water is allowed to flow through both the inlet 1062 and the outlet 1063. For example, the piston 1052 holds the stopper 1035 away from the outlet 1063 such that the stopper 1035 is not blocking water flow through the outlet 1063. Additionally, the piston 1052 is retracted from the closed position, illustrated in FIG. 21, such that the piston 1052 is not holding the stopper 1035 against the inlet 1062 as described above.

When the pump 1066 (shown in FIG. 20) is operating, water is channeled from the hot side 1014 to the cold side 1016 via the bypass valve 1010 as described above. As the cooled water is channeled through the bypass valve 1010, the cooled water is replaced by hot water from the water heater 1068. When the hot water reaches the actuating element 1026, the body 1054 is heated and, based on the temperature of the body 1054, expands to the closed position, which is illustrated in FIG. 21. The check valve 1036 then restricts flow of water through the bypass valve 1010. The temperature of the water surrounding the actuating element 1026 then begins to cool, and at a predetermined temperature, the body 1054 will again contract. If the pump 1066 is still operating, then water from the hot side is channeled through the bypass valve 1010. The process is repeated to maintain hot water at the hot side of the bypass valve 1010. As described above, over time the range of motion of the actuating element 1026 is diminished, and eventually the actuating element 1026 fails, wherein the amount of expansion and contraction is not enough to maintain the bypass valve 1010 in the closed state and/or the open state. With prior systems, the actuating element 1026 fails in an open state, wherein water is able to flow through the bypass valve 1010 at all times. This is known as bleeding. The bypass valve 1010 is designed to fail in a closed state, wherein flow is restricted through the bypass valve 1010 when the actuating element 1026 fails. The failed state is described below with reference to FIG. 23.

Figure 23:
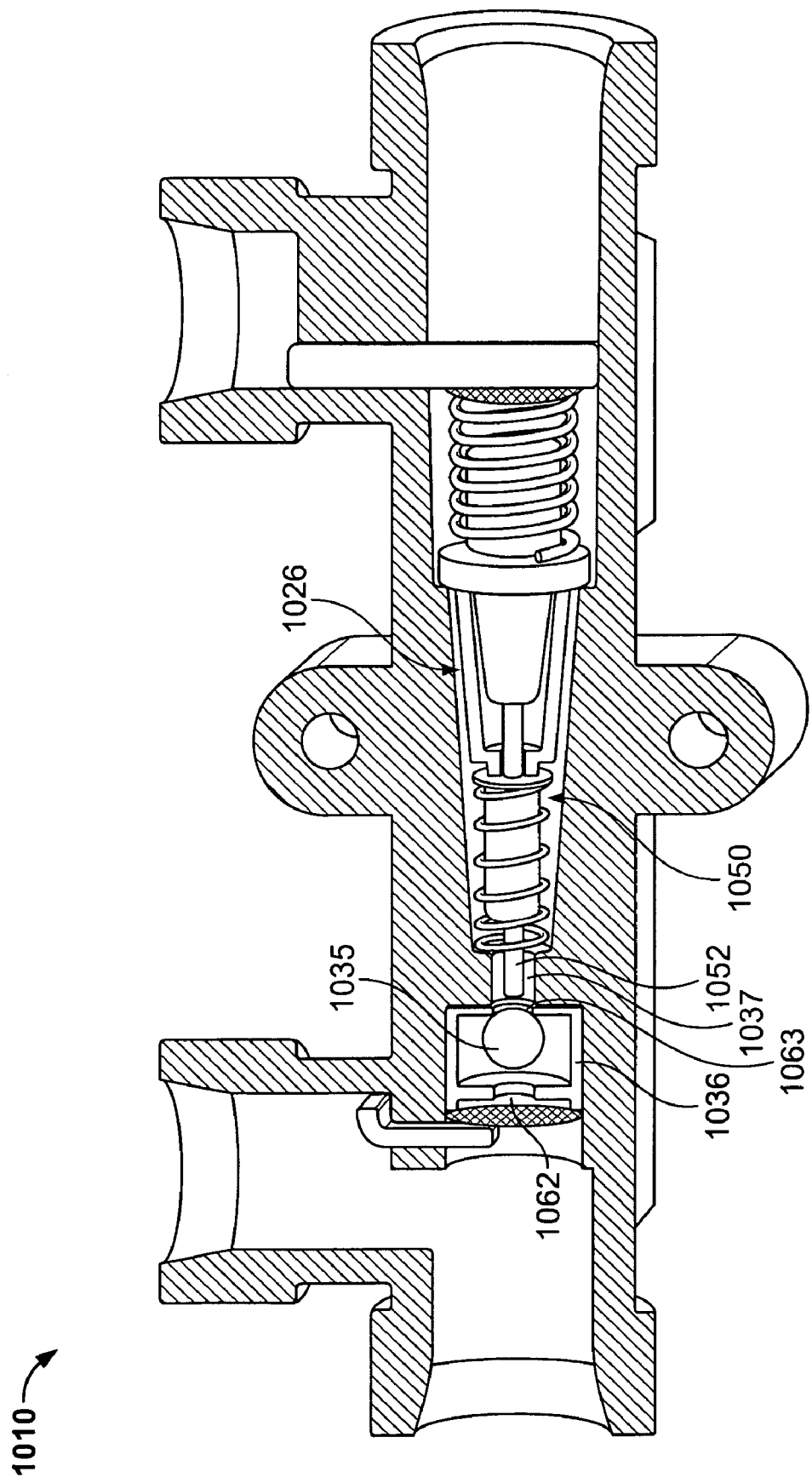
FIG. 23 is a side elevation view of the bypass valve shown in FIG. 21 in a third state.

FIG. 23 is a side elevation view of the bypass valve 1010 in a third state, wherein the actuating element 1026 has failed and the bypass valve 1010 is closed. This failed state is representative of the situation in which the actuating element 1026 can no longer perform a normal operation of maintaining the bypass valve 1010 in the closed state, as illustrated in FIG. 21, and the open state, as illustrated in FIG. 22. In the failed state, the actuating element 1026 is hyper-contracted, wherein the rod member 1050 is retracted beyond an open position. In this hyper-contracted state, the end of the piston 1052 is positioned within the passage 1037. The end of the piston 1052 is contracted beyond the interface of the outlet 1063 such that the piston 1052 no longer holds the stopper 1035 away from the opening defining the outlet 1063. The stopper 1035 is able to plug the outlet 1063 in the failed state. As such, when the pump 1066 (shown in FIG. 20) is operated and a positive head is provided to the hot side of the bypass valve 1010, the flow of the water forces the stopper 1035 to plug the outlet 1063 of the check valve 1036. Similarly, when a negative head is provided to the hot side, such as when the fixture is demanding hot water, the water tends to flow from the cold side of the bypass valve 1010 through the check valve 1036. In this situation, the stopper 1035 is forced by the flow of the water toward the inlet 1062 and the stopper 1035 plugs the inlet 1062 to prevent flow from the cold side to the hot side of the bypass valve 1010. The check valve 1010 thus functions as a two-way valve, restricting flow in both directions, when the bypass valve 1010 is in the failed state.

Figure 24:
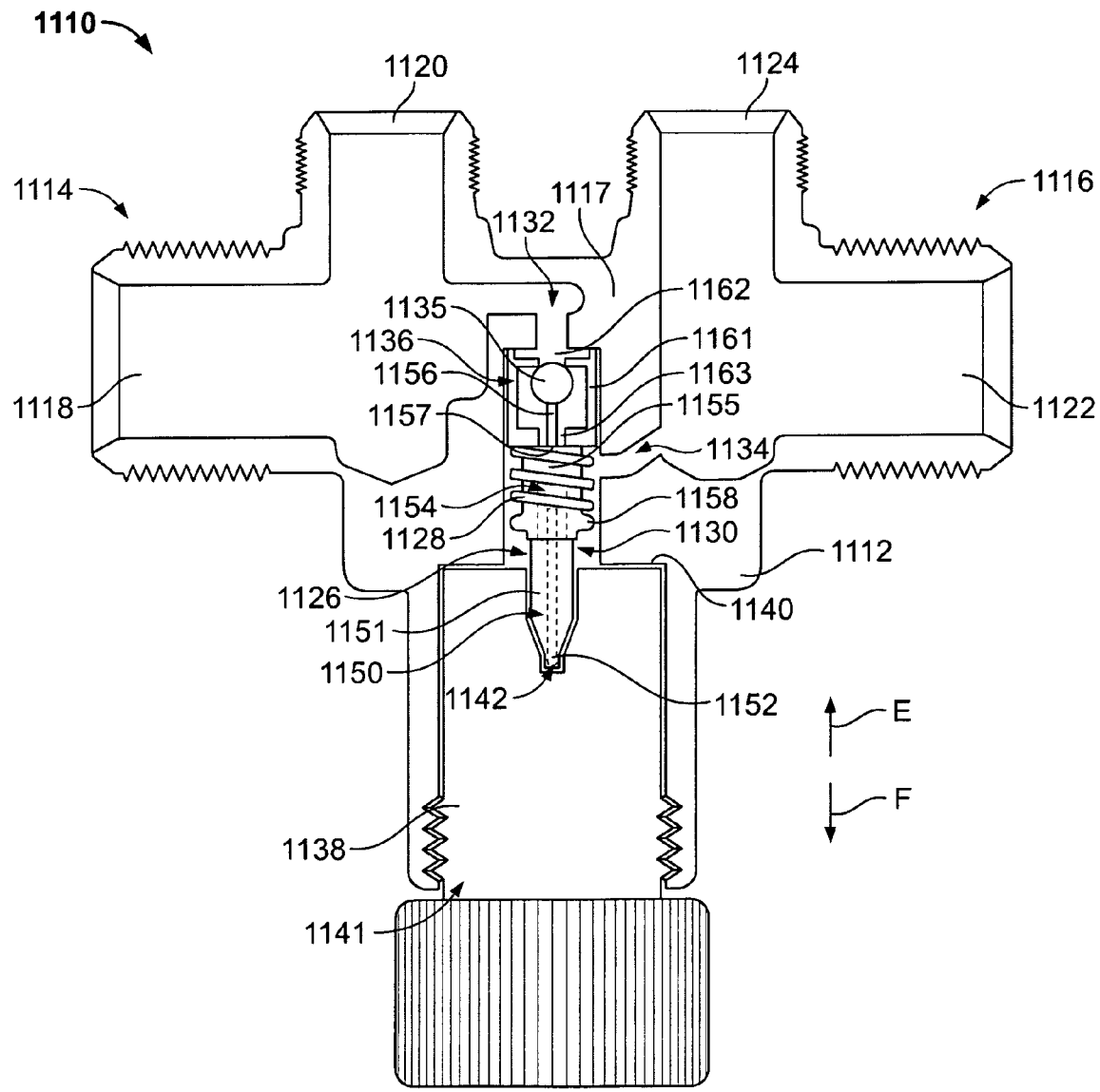
FIG. 24 is a side elevation view of an alternative bypass valve for use within the water distribution system shown in FIG. 20 with a portion of a body of the bypass valve cutaway to illustrate the various components of the bypass valve.

FIG. 24 is a side elevation view of an alternative bypass valve 110 for use within the water distribution system 1067 shown in FIG. 20 with a portion of a body 1112 of the bypass valve 1110 cutaway to illustrate the various components of the bypass valve 1110. The bypass valve 1110 is illustrated in a first or closed state in which water is restricted from flowing through the bypass valve 1110, as will be described in more detail below. The valve body 1112 includes a first end 1114, a second end 1116 and a separating wall 1117 disposed between first end 1114 and second end 1116. First end 1114 is designated to receive and discharge hot water and second end 1116 is designated to receive and discharge cold water from a source of cold water, such as a city water supply system or a local water well. At the first end 1114 (the hot water side) is first inlet port 1118 and first discharge port 1120 and at the second end 1116 (the cold water side) is second inlet port 1122 and second discharge port 1124. The first 1118 and second 1122 inlet ports connect to the hot and cold water distribution system and first 1120 and second 1124 discharge ports connect to the hot and cold water valves on the fixture (e.g., sink, shower, bathtub, appliance, and the like) with which the bypass valve 1110 is utilized.

Valve body 1112 houses a thermally sensitive actuating element 1126, a bias spring 1128, a check valve 1136, and a retaining cap 1138. Valve body 1112 is molded or manufactured to have a main passage 1130 for housing the various components of the actuating element 1136, the bias spring 1128, the check valve 1136 and the retaining cap 1138. The valve body 1112 is also molded or manufactured to have a first or hot side connecting passage 1132 and a second or cold side connecting passage 1134. The hot side connecting passage 1132 interconnects the first end 1114 and the main passage 1130 and the cold side connecting passage 1134 interconnects the second end 1116 and the main passage 1130. As such a fluid path is created between the first and second sides 1114 and 1116 via the passages 1130, 1132 and 1134. The main passage 1130 includes an internal shoulder 1140 for positioning one end of the retaining cap 1138. The valve body 1112 is designed so the components can fit through an opening 1141 at an end of the main passage 1130 during manufacture or repair of the bypass valve 1110. The retaining cap 1138 may be threadably coupled to the valve body 1112 at the opening 1141. The retaining cap 1138 retains the various components within the main passage 1130 and closes and seals the opening 1141. In the illustrated embodiment, the retaining cap 1138 includes a recess 1142 that receives a portion of the actuating element 1126 and operates as a stop or an abutment for the actuating element 1126.

Optionally, thermally sensitive actuating element 1126 may be of the wax filled cartridge type having a main body 1154 with a portion surrounded by a casing 1155 and an integral rod member 1150 extending from the main body 1154. Rod member 1150 comprises a washer 1151 attached to a piston 1152. One end of the piston 1152 is received within the recess 1142 and engages the retaining cap 1138. The other end of the piston 1152 is received within the casing 1155. The end of the piston 1152 within the casing 1155 is movable within the casing 1155 during actuation (e.g. expansion and contraction) of the actuation element 1126. The washer 1151 allows for relative movement of the piston 1152 within the casing 1155. An extension arm 1156 extends from a base 1157 of the casing 1155 opposite the washer 1151. The extension arm 1156 extends into the check valve 1136, as explained in further detail below. The casing 1155 includes a section 1158 of increased diameter defining a rim. The bias spring 1128 extends between the check valve 1136 and the section 1158. The bias spring 1128 forces the casing 1155 generally away from the check valve 1136.

Actuating element 1126 comprises a wax or a mixture of wax and metal powder (e.g., copper powder) enclosed in the casing 1155. Upon heating the wax or wax with copper powder mixture slowly expands, thereby pushing against piston 1152 and forcing the casing 1155 in an outward direction away from the retaining cap 1138 in the direction of the check valve 1136, indicated by arrow E. Upon cooling, the wax or wax/copper powder mixture contracts and the bias spring 1128 forces the casing 1155 away from the check valve 1136, indicated by arrow F. When the wax or wax/copper mixture contracts, the end of the piston 1152 is more deeply received within the casing 1155 by replacing a portion of the space previously taken up by the wax or wax/copper mixture. The temperature of the water surrounding the actuating element 1126 is transferred by the casing 1155 to the wax or wax/copper mixture to allow the expansion and contraction.

The check valve 1136 is similar to the check valve 1036 described with respect to FIGS. 21-23. The check valve 1136 includes a body 1161 having an inlet 1162 and an outlet 1163. The inlet 1162 is positioned on the hot side of the check valve 1136 (e.g. the side facing and communicating with the hot water inlet) and the outlet 1163 is positioned on the cold side of the check valve 1136 (e.g. the side facing and communicating with the cold water inlet). A stopper 1135 is received within the body 1161 and is positioned between the inlet 1162 and the outlet 1163. The stopper 1135 is movable within the body 1161 to stop water flow therethrough based on a position of the stopper 1135 with respect to the inlet 1162 and the outlet 1163. The stopper 1135 is sized and shaped to fill or cover the openings defining the inlet 1162 or outlet 1163 to restrict water flow therethrough. As indicated above, the actuating arm 1156 of the actuating element 1126 is received through the outlet 1163 for positioning the stopper 1135 within the check valve 1136. The actuating arm 1156 and the stopper 1135 are illustrated in a closed state in FIG. 24. The actuating arm 1156 holds the stopper against the inlet 1162. When the actuating element 1126 is moved to an open position, the actuating arm 1156 is moved away from the inlet 1162, and the stopper 1135 is free to move to an open or neutral position wherein water can flow through the inlet 1162 and into the outlet 1163. When the actuating element 1126 is in a failed state, similar to that which was explained above, the stopper 1135 is able to block the outlet 1163 and prevent water flow through the outlet 1163.

In operation, the actuating element 1126 is operable in three states, namely an open state, a closed state, and a failed state. The actuating element 1126 transitions between the open and closed states based on a temperature of the water at the bypass valve 1110. For example, the body of the actuating element 1126 expands and contracts based on temperature. In the closed state, the wax or wax/copper mixture of the actuating element 1126 is expanded within the casing 1155, thus forcing the casing 1155 away from the piston 1152 and toward the check valve 1136. In the closed position, the actuating element 1126 is actuated to an extent such that the actuating arm 1156 forces the stopper 1135 to plug the inlet 1162 and restrict flow of water through the check valve 1136. As the wax or wax/copper mixture of the thermal actuator 1126 cools, the thermal actuator 1126 will, at some point, contract, and the bias spring 1128 forces the casing 1155 away from the check valve 1136. When the wax or wax/copper mixture contracts, the actuator arm 1156 releases the stopper 1135 from the closed position and water flows through the inlet 1162. In the failed state, the wax or wax/copper mixture no longer expands to an extent wherein the actuator arm 1156 is positioned beyond the outlet 1163. Accordingly, the stopper 1135 is able to freely move within the check valve 1136 to plug the inlet 1162 and the outlet 1163, depending on the flow direction of the water through the bypass valve 1110.

Figure 25:
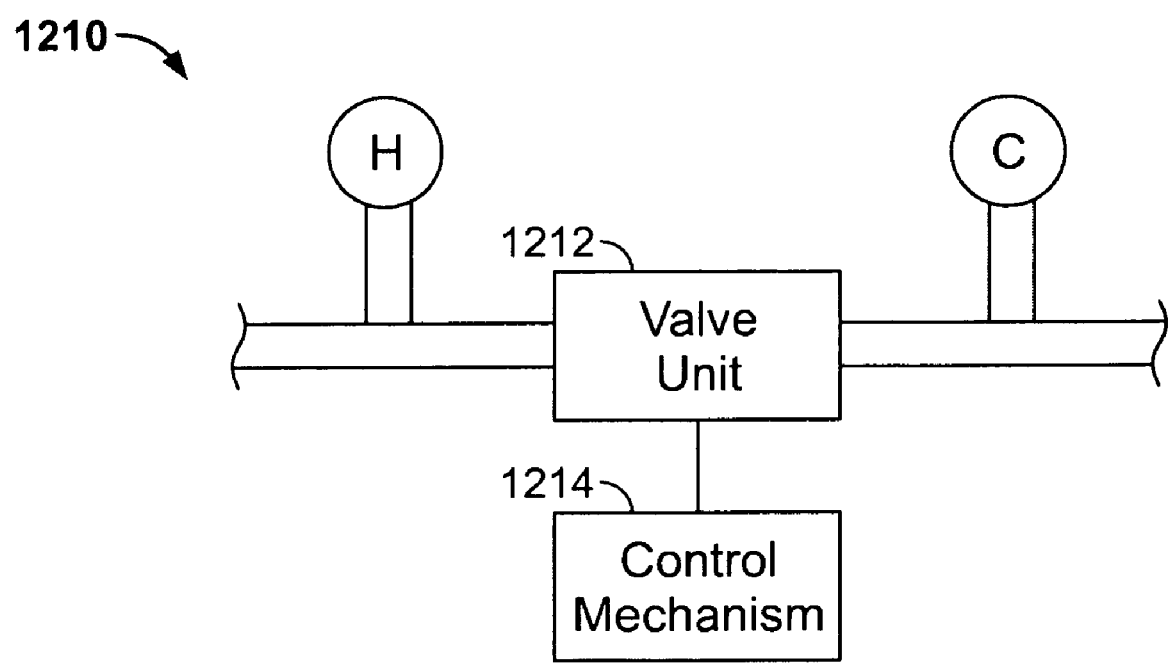
FIG. 25 is a schematic view of an alternative bypass valve for use within the water distribution system shown in FIG. 20.

FIG. 25 is a schematic view of an alternative bypass valve 1210 for use within the water distribution system 1067 shown in FIG. 20. The bypass valve 1210 includes a valve unit 1212 and a control mechanism 1214. The bypass valve 1210 is positioned between a hot water supply pipe on a hot side, indicated generally by H, and a cold water supply pipe on a cold side, indicated generally by C. Optionally, the bypass valve 1210 may be positioned in a similar manner as described with reference to FIG. 20. The bypass valve 1210 may include four ports as described above, or alternatively, may include only two ports that interconnect with the hot and cold supply pipes. Flow through the bypass valve 1210 is generally provided from the hot side to the cold side to flush the cooled water in the hot supply pipes and replenish that cooled water with hot water. A pump may be provided to channel the water through the system. Optionally, the valve unit 1212 may restrict water flow in a direction from the cold side to the hot side at all times.

The control mechanism 1214 is operable to control an operative state of the valve unit 1212. Optionally, the control mechanism 1214 may be a thermostatic actuator, similar to the actuating elements described above. In alternative embodiments, the control mechanism 1214 may be controlled by other methods or devices, such as electronically controlled or controlled by devices other than a thermostatic actuator. In such embodiments, the control mechanism 1214 may be controlled based on water characteristics such as temperature, flow, pressure, and the like.

The valve unit 1212 is operable in three operative states; a closed state, an open state and a failed state. In the closed state, the valve unit 1212 restricts flow from the hot side to the cold side. In the open state, the valve unit 1212 allows flow from the hot side to the cold side. In the failed state, the valve unit 1212 restricts flow from the hot side to the cold side.

Figure 26:
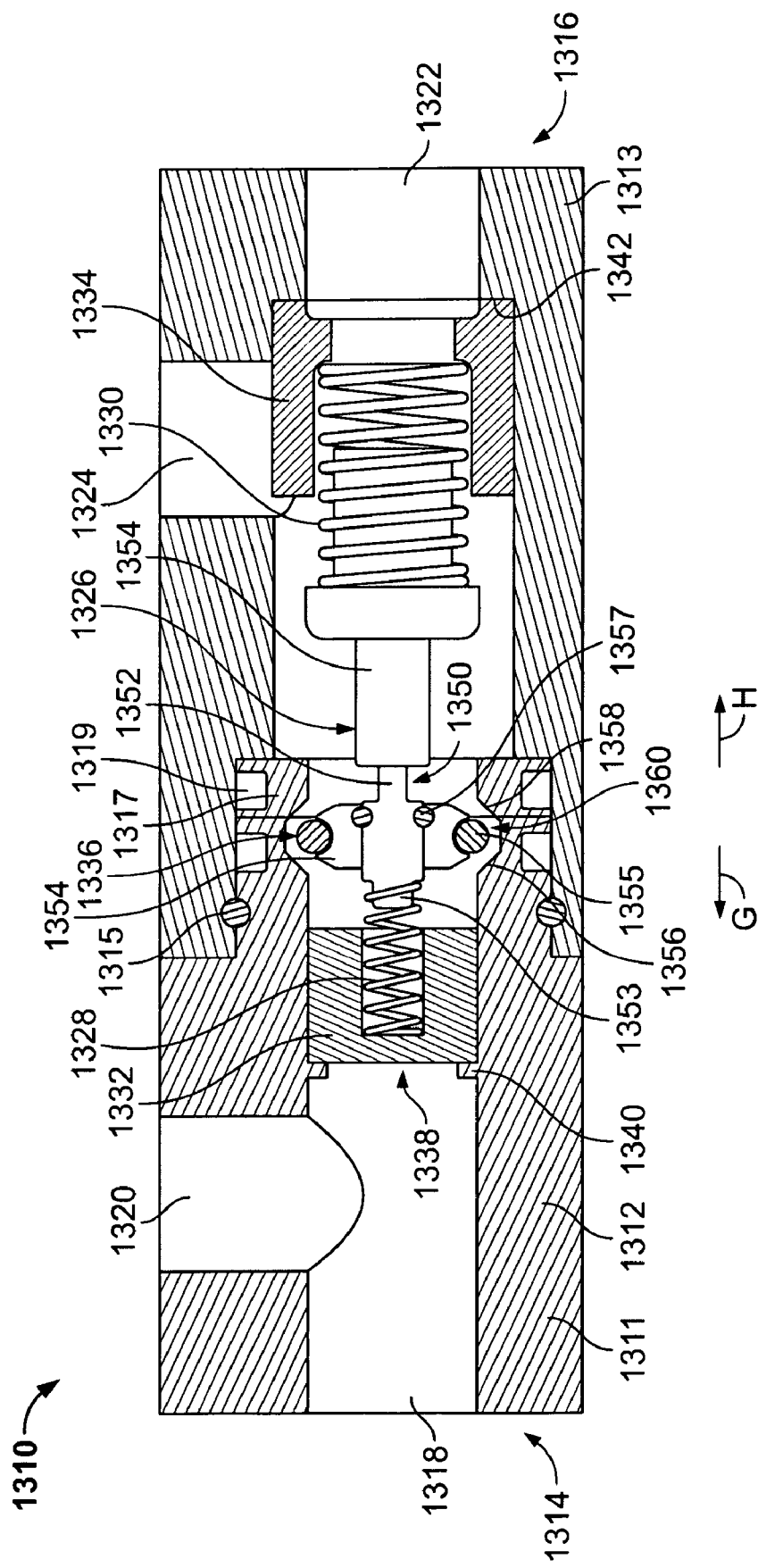
FIG. 26 a side elevation view of an alternative bypass valve for use within the water distribution system shown in FIG. 20 with a portion of a body of the bypass valve cutaway to illustrate the various components of the bypass valve.

FIG. 26 is a side elevation view of an alternative bypass valve 1310 for use within the water distribution system 1067 shown in FIG. 20 with a portion of a body 1312 of the bypass valve 1310 cutaway to illustrate the various components of the bypass valve 1310. The bypass valve 1310 is operable in a first or closed state in which water is restricted from flowing through the bypass valve 1310; a second or open state in which water is allowed to flow through the bypass valve 1310; and a third or failed state in which water is restricted from flowing through the bypass valve 1310. The bypass valve 1310 is illustrated in the second or open state in FIG. 26.

The valve body 1312 includes a first body portion 1311 and a second body portion 1313. The body portions 1311, 1313 are joined to one another to form the valve body 1312. For example, pins 1315 may be used to hold the body portions together. Alternatively, the body portions 1311, 1313 may be threadably coupled to one another, or coupled together using other methods such as welding. Optionally, a seal 1319 may be provided between the body portions 1311, 1313 to resist leakage. In an alternative embodiment, the body 1312 may be a unitary structure.

The body 1312 includes a first end 1314, a second end 1316 and a separating wall 1317 disposed between the first end 1314 and the second end 1316. Optionally, the separating wall 1317 may be separately provided from the first and second body portions 1311, 1313. Alternatively, the wall 1317 may be formed integrally with, molded, or manufactured into one or both of the body portions 1311, 1313. First end 1314 is designated to receive and discharge hot water and second end 1316 is designated to receive and discharge cold water from a source of cold water, such as a city water supply system or a local water well. At the first end 1314 (the hot water side) is first inlet port 1318 and first discharge port 1320 and at the second end 1316 (the cold water side) is second inlet port 1322 and second discharge port 1324. The inlet and discharge ports are illustrated as female ports, but the inlet and discharge ports may be male ports in alternative embodiments. Additionally, the ports may be threaded. The first 1318 and second 1322 inlet ports connect to the hot and cold water distribution system and first 1320 and second 1324 discharge ports connect to the hot and cold water valves on the fixture (e.g., sink, shower, bathtub, appliance, and the like) with which the bypass valve 1310 is utilized. The bypass valve 1310 may generally be used for a higher demand system as compared to the bypass valve 1010 or 1110 (shown in FIGS. 20-25). For example, the amount of water allowed to flow between the first and second ends 1314, 1316 is greater than for the bypass valves 1010 or 1110 as the opening through the wall 1317 is larger. As such, the pump is capable of channeling the water through the pipe system more quickly when using the bypass valve 1310, or the pump is capable of channeling more water through the pipe system when using the bypass valve 1310.

Valve body 1312 houses a thermally sensitive actuating element 1326, a bias spring 1328, an over-travel spring 1330, a first spring retainer 1332, a second spring retainer 1334, and a check valve 1336. In the illustrated embodiment, the spring retainers 1332, 1334 are separately provided from and received within the body portions 1311, 1313, respectively. Alternatively, the spring retainers 1332, 1334 may be integrally formed with, molded or manufactured into the body portions 1311, 1313, respectively. The spring retainers 1332, 1334 are designed and positioned to allow water to flow through or around the spring retainers 1332, 1334. Valve body 1312 is molded or manufactured to have a main passage 1338 for housing the various components of the valve 1310. The main passage 1330 includes an internal shoulder 1340 for positioning one end of first spring retainer 1332 and the main passage 1330 includes an internal shoulder 1342 for positioning one end of the second spring retainer 1334. The valve body 1312 is designed so the components can fit through the joined ends of the body portions 1311, 1313 prior to joining the body portions 1311, 1313 to one another.

Optionally, thermally sensitive actuating element 1326 may be of the wax filled cartridge type having a main body 1354 and an integral rod member 1350 extending from the main body 1354. Rod member 1350 comprises a piston 1352 and a disk 1354 slidably coupled to the piston 1352. The disk 1354 is sized to substantially fill the passage 1338, or at least a portion of the passage, to restrict flow of water through the passage 1338 when the disk 1354 is positioned at a predetermined position or positions, such as at a forward-most position and a rearward-most position. For example, in the forward-most position, the disk 1354 engages a forward wall portion 1356 of the valve body 1312; and in the rearward-most position, the disk 1354 engages a rearward wall portion 1358 of the valve body 1312. The forward wall portion 1356 is a necked-down section having a reduced diameter as compared to a central portion 1360 of the passage 1338 between the forward and rearward wall sections 1356, 1358; and the rearward wall portion 1358 is a necked-down section having a reduced diameter as compared to the central portion 1360. Optionally, the rearward wall portion 1356 may be included within the wall 1317. Additionally, at least one position, and possibly many positions are provided in which water is able to flow past the disk 1354, such as when the disk 1354 is positioned within the central portion 1360. Optionally, the disk 1354 may include an annular seal 1355 around the perimeter of the disk 1354 to establish a seal between the disk 1354 and the walls of the passage 1338. Optionally, the piston 1352 may include at least one o-ring or snap ring 1357 that operates to limit the range of motion of the disk 1354 along the piston 1352. In an alternative embodiment, the disk 1354 may be fixedly coupled to, or integrally formed with, the piston 1352. Optionally, the piston 1352 includes a stepped-down portion 1353 proximate an end of the piston 1352. The stepped down portion 1353 provides a shoulder for engaging the bias spring 1328.

Actuating element 1326 comprises a wax or a mixture of wax and metal powder (e.g., copper powder). Upon heating, the wax or wax with copper powder mixture slowly expands, thereby pushing against piston 1352 and forcing the piston 1352 in the hot side direction, indicated by arrow G. The piston 1352 is forced to the closed position wherein the disk 1354 engages the valve body 1312 and stops water flow therethrough. Upon cooling, the wax or wax/copper powder mixture contracts and the bias spring 1328 forces the piston 1152 in the cold side direction, indicated by arrow H. The piston 1352 is moved to a position wherein the disk 1354 is moved away from the valve body 1312 and water is allowed to flow from the hot side to the cold side. Optionally, as described above, the disk 1354 is free to move along the piston 1352. For example, when a negative head is created on the hot side, such as when the hot water is turned on, the water tends to flow from the cold side to the hot side. The disk 1354 is moved in the hot side direction, indicated by arrow G, along the piston 1352 until the disk 1354 engages the valve body 1312, thus restricting flow of water from the cold side to the hot side even when the actuator 1326 is in the contracted position.

In operation, the actuating element 1326 is operable in three states, namely an open state, a closed state, and a failed state. The actuating element 1326 transitions between the open and closed states based on a temperature of the water at the bypass valve 1310. For example, the body of the actuating element 1326 expands and contracts based on temperature. In the closed state, the wax or wax/copper mixture of the actuating element 1326 is expanded, thus forcing the piston 1352 toward the forward wall portion 1356 of the valve body 1312. In the closed position, the actuating element 1326 is actuated to an extent such that the piston 1352 forces the disk 1354 to plug the passage 1338 and restrict flow of water therethrough. As the wax or wax/copper mixture of the thermal actuator 1326 cools, the thermal actuator 1326 will, at some point, contract, and the bias spring 1328 forces the piston toward the rearward wall portion 1358. When the wax or wax/copper mixture contracts, the piston 1352 releases the disk 1354 from the closed position and water flows through the passage 1338. In the failed state, the wax or wax/copper mixture no longer expands to an extent wherein the disk 1354 is positioned away from the rearward wall portion 1358. Accordingly, the disk 1354 engages the rearward wall portion 1358 to plug the passage 1338. As such, the disk 1354 and valve body 1312 constitute a check valve and operate in a similar manner as the check valve 1036 described above.

Actuating element 1326 comprises a wax or a mixture of wax and metal powder (e.g., copper powder). Upon heating, the wax or wax with copper powder mixture slowly expands, thereby pushing against piston 1352 and forcing the piston 1352 in the hot side direction, indicated by arrow G. The piston 1352 is forced to the closed position wherein the disk 1354 engages the valve body 1312 and stops water flow therethrough. Upon cooling, the wax or wax/copper powder mixture contracts and the bias spring 1328 forces the piston 1152 in the cold side direction, indicated by arrow H. The piston 1352 is moved to a position wherein the disk 1354 is moved away from the valve body 1312 and water is allowed to flow from the hot side to the cold side. Optionally, as described above, the disk 1354 is free to move along the piston 1352. For example, when a negative head is created on the hot side, such as when the hot water is turned on, the water tends to flow from the cold side to the hot side. The disk 1354 is moved in the hot side direction, indicated by arrow G, along the piston 1352 until the disk 1354 engages the valve body 1312, thus restricting flow of water from the cold side to the hot side even when the actuator 1326 is in the contracted position.

In operation, the actuating element 1326 is operable in three states, namely an open state, a closed state, and a failed state. The actuating element 1326 transitions between the open and closed states based on a temperature of the water at the bypass valve 1310. For example, the body of the actuating element 1326 expands and contracts based on temperature. In the closed state, the wax or wax/copper mixture of the actuating element 1326 is expanded, thus forcing the piston 1352 toward the forward wall portion 1356 of the valve body 1312. In the closed position, the actuating element 1326 is actuated to an extent such that the piston 1352 forces the disk 1354 to plug the passage 1338 and restrict flow of water therethrough. As the wax or wax/copper mixture of the thermal actuator 1326 cools, the thermal actuator 1326 will, at some point, contract, and the bias spring 1328 forces the piston toward the rearward wall portion 1358. When the wax or wax/copper mixture contracts, the piston 1352 releases the disk 1354 from the closed position and water flows through the passage 1338. In the failed state, the wax or wax/copper mixture no longer expands to an extent wherein the disk 1354 is positioned away from the rearward wall portion 1358. Accordingly, the disk 1354 engages the rearward wall portion 1358 to plug the passage 1338. As such, the disk 1354 and valve body 1312 constitute a check valve and operate in a similar manner as the check valve 1036 described above.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use, and the various features from the various embodiments may be interchanged without departing from the spirit and scope of the invention.

What is claimed is:

1. A bypass valve for use in a bypass path of a water circulation system, the bypass valve comprising:
    a valve unit in the bypass path of the water circulation system, the valve unit operable in a closed state, an open state, and a failed state, wherein the valve unit restricts water flow through the bypass path in the closed state, the valve unit allows water flow through the bypass path in the open state, and the valve unit restricts water flow through the bypass path in the failed state; and
    a control mechanism in the bypass path of the water circulation system, the control mechanism used for controlling the operation of the valve unit, wherein water flowing through the bypass path flows past the control mechanism.

2. A bypass valve in accordance with claim 1, wherein the control mechanism is housed within the valve unit.

3. A bypass valve in accordance with claim 1, wherein the control mechanism comprises a thermally sensitive actuating element.

4. A bypass valve in accordance with claim 1, wherein the control mechanism is controlled based on at least one of a flow switch, a pressure switch, a temperature switch and a manual switch.

5. A bypass valve in accordance with claim 1, wherein the valve unit comprises a check valve having a stopper.

6. A bypass valve in accordance with claim 1, wherein the valve unit includes a hot water inlet configured to communicate with a hot water supply line and a cold water inlet configured to communicate with a cold water supply line, the valve unit allowing water to flow from the hot water inlet to the cold water inlet when the valve unit is operating in the open state.

7. A bypass valve in accordance with claim 1, wherein the valve unit is configured to be positioned adjacent a fixture.

8. A bypass valve in accordance with claim 1, wherein the valve unit is configured to be formed integral with a fixture.

9. A bypass valve in accordance with claim 1, wherein the control mechanism includes an actuating element being movable within the valve unit, the actuating element interacting with the valve unit when the valve unit is in the closed state, the actuating element interacting with the valve unit when the valve unit is in the open state, the actuating element not interacting with the valve unit when the valve unit is in the failed state.

10. A bypass valve in accordance with claim 1, wherein the valve unit includes a flow path therethrough, the control mechanism allowing the flow path to be opened or closed based on an operating state of the control mechanism.

11. A bypass valve comprising:
a housing having a hot water port configured to communicate with a hot water supply line and a cold water port configured to communicate with a cold water supply line, the housing having a passage permitting recirculating flow between the hot and cold water ports;
a valve member operable in a closed state, an open state, and a failed state, wherein the valve member restricts water flow through the passage in the closed state, the valve member allows water flow through the passage in the open state, and the valve member restricts water flow through the passage in the failed state; and
a control mechanism for controlling the operation of the valve member.

12. A bypass valve in accordance with claim 11, wherein the control mechanism comprises a thermally sensitive actuating member, disposed within the housing, the thermally sensitive actuating member extending when heated and contracting when cooled.

13. A bypass valve in accordance with claim 11, wherein the control mechanism comprises a thermally sensitive actuating member opening and closing the passage based on a temperature of the thermally sensitive actuating member.

14. A bypass valve in accordance with claim 11, wherein the control mechanism comprises a rod extending through the passage and engaging the valve member in the open state.

15. A bypass valve in accordance with claim 11, wherein the valve member comprises a check valve having a stopper configured to restrict water flow to the passage.

16. A bypass valve in accordance with claim 11, wherein the valve member comprises a check valve having an inlet in fluid communication with the hot water port and an outlet in fluid communication with the passage, the check valve having a stopper configured to close the outlet in the failed state to restrict water flow through the passage.

17. A bypass valve in accordance with claim 11, wherein the valve member comprises a check valve having an outlet seat facing the passage and a stopper configured to restrict water flow through the check valve when resting against the outlet seat, the stopper resting against the outlet seat when in the failed state.

18. A bypass valve in accordance with claim 11, wherein the valve member comprises a check valve having an outlet seat facing the passage and a stopper configured to restrict water flow through the check valve when resting against the outlet seat, the control mechanism engaging the stopper to position the stopper away from the outlet seat when in the open state.

19. A bypass valve in accordance with claim 11, wherein the valve member comprises a poppet configured to close the passage.

20. A bypass valve in accordance with claim 11, wherein the hot water port and the cold water port are formed integral with one another as part of the housing.

21. A bypass valve in accordance with claim 11, wherein the housing comprises a first end portion and a second end portion being coupled to one another to as part of form the housing, the first end portion including the hot water port and the second end portion including the cold water port.

22. A bypass valve in accordance with claim 11, wherein the hot water port includes a hot inlet port and a hot discharge port located proximate to and integral with one another, the hot inlet port being configured to receive hot water, the hot discharge port being configured to discharge the hot water, the cold water port and the hot inlet and discharge ports being formed integral with one another as part of a one-piece body.

23. A bypass valve in accordance with claim 11, wherein the cold water port includes a cold inlet port and a cold discharge port located proximate to one another, the cold inlet port being configured to receive cold water, the cold discharge port being configured to discharge the cold water, the hot water port and the cold inlet and discharge ports being formed integral with one another as part of a one-piece body.

24. A bypass valve in accordance with claim 11, wherein the control mechanism includes an actuating element being movable within the valve member, the actuating element interacting with the valve member when the valve member is in the closed state, the actuating element interacting with the valve member when the valve member is in the open state, the actuating element not interacting with the valve member when the valve member is in the failed state.

25. A bypass valve in accordance with claim 11, wherein the valve member includes a flow path therethrough, the control mechanism allowing the flow path to be opened or closed based on an operating state of the control mechanism.

26. A bypass valve in accordance with claim 11, wherein the recirculating flow flows into the housing through the hot water port and the recirculating flow flows out of the housing through the cold water port when the valve member is in the open state.

27. A bypass valve in accordance with claim 11, wherein the bypass valve is configured for use with a fixture that dispenses water, the fixture operable in an on state and an off state, the fixture dispensing water in the on state and the fixture not dispensing water in the off state, the bypass valve being operable independent of the operation of the fixture, wherein the control mechanism is configured to change operation of the valve member from the closed state to the open state to allow recirculating flow through the passage when the fixture is in the off state.

28. A bypass valve in accordance with claim 11, wherein the control mechanism includes an actuating element positioned in the valve member when the valve member is operated in the closed state and when the valve member is operated in the open state, the actuating element being positioned outside of the valve member when the valve member is operated in the failed state.

29. A bypass valve for a water circulation system, the bypass valve comprising:
a valve unit operable in a closed state, an open state, and a failed state, wherein the valve unit restricts water flow in the closed state, the valve unit allows water flow in the open state, and the valve unit restricts water flow in the failed state; and
a control mechanism for controlling the operation of the valve unit, wherein the control mechanism includes an actuating element positioned in the valve unit when the valve unit is operated in the closed state and when the valve unit is operated in the open state, the actuating element being positioned outside of the valve unit when the valve unit is operated in the failed state.

30. A bypass valve comprising:

a housing having a hot water port configured to communicate with a hot water supply line and a return port configured to discharge water from the housing for recirculation to a hot water source, the housing having a passage permitting recirculating flow between the hot water port and the return port;

a valve member operable in a closed state, an open state, and a failed state, wherein the valve member restricts water flow through the passage in the closed state, the valve member allows water flow through the passage in the open state, and the valve member restricts water flow through the passage in the failed state; and a control mechanism for controlling the operation of the valve member.

31. A bypass valve in accordance with claim 30, wherein the control mechanism comprises a thermally sensitive actuating member, disposed within the housing, the thermally sensitive actuating member extending when heated and contracting when cooled.

32. A bypass valve in accordance with claim 30, wherein the control mechanism comprises a thermally sensitive actuating member opening and closing the passage based on a temperature of the thermally sensitive actuating member.

33. A bypass valve in accordance with claim 30, wherein the control mechanism comprises a rod extending through the passage and engaging the valve member in the open state.

34. A bypass valve in accordance with claim 30, wherein the control mechanism includes an actuating element positioned in the valve member when the valve member is operated in the closed state and when the valve member is operated in the open state, the actuating element being positioned outside of the valve member when the valve member is operated in the failed state.

35. A bypass valve in accordance with claim 30, wherein the control mechanism includes an actuating element being movable within the valve member, the actuating element interacting with the valve member when the valve member is in the closed state, the actuating element interacting with the valve member when the valve member is in the open state, the actuating element not interacting with the valve member when the valve member is in the failed state.

36. A bypass valve in accordance with claim 30, wherein the valve member includes a flow path therethrough, the control mechanism allowing the flow path to be opened or closed based on an operating state of the control mechanism.

37. A bypass valve in accordance with claim 30, wherein the recirculating flow flows into the housing through the hot water port and the recirculating flow flows out of the housing through the return port when the valve member is in the open state.

38. A bypass valve in accordance with claim 30, wherein the return port is configured to be coupled to a dedicated hot water return line in flow communication with a hot water source or a cold water supply line in fluid communication with a hot water source.

39. A bypass valve in accordance with claim 30, wherein the bypass valve is configured for use with a fixture that dispenses water, the fixture operable in an on state and an off state, the fixture dispensing water in the on state and the fixture not dispensing water in the off state, the bypass valve being operable independent of the operation of the fixture, wherein the control mechanism is configured to change operation of the valve member from the closed state to the open state to allow recirculating flow through the passage when the fixture is in the off state.

* * * * *